(12) United States Patent
Goto et al.

(10) Patent No.: US 8,165,748 B2
(45) Date of Patent: Apr. 24, 2012

(54) INFORMATION PROVIDING SYSTEM, INFORMATION PROVIDING METHOD, AND COMPUTER PROGRAM

(75) Inventors: Souju Goto, Yokohama (JP); Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 335 days.

(21) Appl. No.: 12/517,831

(22) PCT Filed: Dec. 5, 2007

(86) PCT No.: PCT/JP2007/073451
§ 371 (c)(1),
(2), (4) Date: Jun. 5, 2009

(87) PCT Pub. No.: WO2008/069225
PCT Pub. Date: Jun. 12, 2008

(65) Prior Publication Data
US 2011/0035098 A1    Feb. 10, 2011

(30) Foreign Application Priority Data

Dec. 5, 2006 (JP) ................................ 2006-328870
Apr. 27, 2007 (JP) ................................ 2007-118322

(51) Int. Cl.
*G06F 7/00* (2006.01)
(52) U.S. Cl. .......... 701/36; 701/117; 701/400; 340/905; 340/915; 340/932.2
(58) Field of Classification Search .................... 701/36, 701/117, 400, 430; 340/905, 919, 915, 932.2
See application file for complete search history.

(56) References Cited

U.S. PATENT DOCUMENTS

| | | | | |
|---|---|---|---|---|
| 5,636,245 A * | 6/1997 | Ernst et al. | ..................... | 375/259 |
| 6,657,558 B2 * | 12/2003 | Horita et al. | ............. | 340/995.13 |
| 6,759,970 B1 * | 7/2004 | Horita et al. | ................. | 340/905 |
| 6,785,551 B1 * | 8/2004 | Richard | ..................... | 455/456.1 |

(Continued)

FOREIGN PATENT DOCUMENTS

DE    10 2005 024 970      11/2006

(Continued)

OTHER PUBLICATIONS

International Search Report for PCT/JP2007/073451.

(Continued)

*Primary Examiner* — Toan To
(74) *Attorney, Agent, or Firm* — Eric J. Robinson; Robinson Intellectual Property Law Office, P.C.

(57) ABSTRACT

An on-vehicle device (200) includes a self-position detection unit (254), a position match judgment unit (255), an advance direction detection unit (256), and a direction match judgment unit (257). At the moment when a mobile body such as a vehicle having the on-vehicle device passes through an intended point of a data distribution side in an intended direction, a data reproduction unit (253) starts reproduction of content data associated with creation of the data distribution side acquired by a data acquisition unit (251). When there a plurality of content data intended to be simultaneously reproduced by the data distribution side, it is judged by a parallel reproduction judgment unit (252), and the data reproduction unit (253) reproduces the content data in parallel. The data is reproduced according to the intention of the data distribution side.

37 Claims, 17 Drawing Sheets

U.S. PATENT DOCUMENTS

| | | | |
|---|---|---|---|
| 7,990,283 B2* | 8/2011 | Breed | 340/903 |
| 8,023,883 B1* | 9/2011 | Lee et al. | 455/3.02 |
| 8,121,776 B2* | 2/2012 | Hiruta et al. | 701/117 |
| 2003/0152200 A1* | 8/2003 | Bruce et al. | 379/88.18 |
| 2003/0179110 A1 | 9/2003 | Kato | |

FOREIGN PATENT DOCUMENTS

| | | |
|---|---|---|
| JP | 2002-350153 | 12/2002 |
| JP | 2003-099670 | 4/2003 |
| JP | 2005-181205 | 7/2005 |
| JP | 2005-341508 | 12/2005 |
| JP | 2006-202199 | 8/2006 |
| JP | 2006-329983 | 12/2006 |
| JP | 2006-338553 | 12/2006 |

OTHER PUBLICATIONS

Supplementary European Search Report (Application No. 07850093.1) dated Aug. 5, 2011.

Office Action (Japanese Application No. 2008-548303) dated Nov. 21, 2011.

International Preliminary Examination Report (Application No. PCT/JP2007/073451) dated Jun. 18, 2009.

* cited by examiner

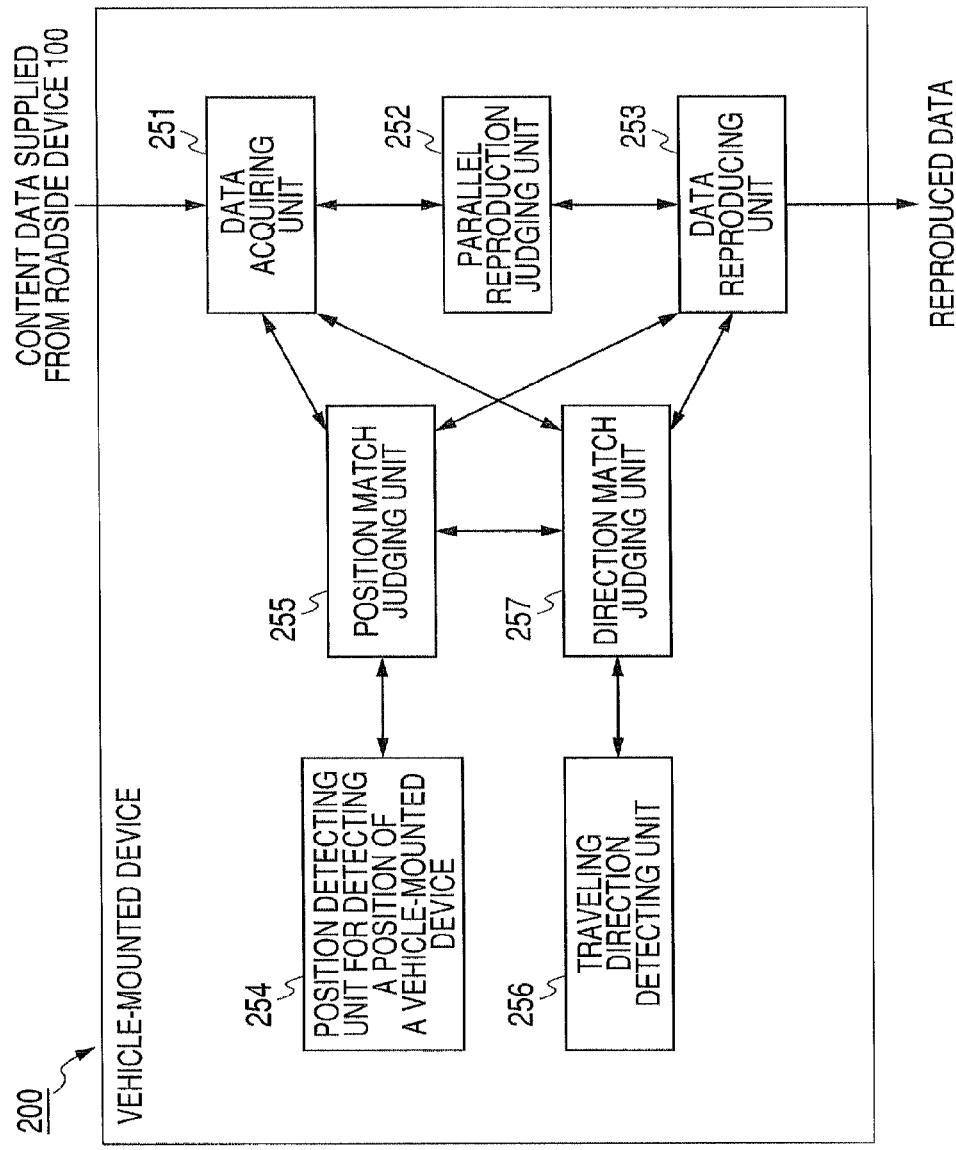

FIG. 6

| BIT BYTE | 7 (MSB) | 6 | 5 | 4 | 3 | 2 | 1 | 0 (LSB) |
|---|---|---|---|---|---|---|---|---|
| 1 | (RESERVED) ||||||||
| 2 | PUSH ID ||||||||
| 3 | LANGUAGE ID (FIRST BYTE) ||||||||
| 4 | LANGUAGE ID (SECOND BYTE) ||||||||
| 5 | APPLICATION TYPE ||||||||
| 6 | CONTENT TYPE ||||||||
| 7 | PRIORITY || (RESERVED) ||||||
| 8 TO 11 | CONTENT SIZE ||||||||
| 12 | PUSH BODY LENGTH ||||||||
| 13 TO 20 | (RESERVED) ||||||||
| 21 ⋮ | DATA OF COMMERCIAL CONTENT DATA, COMMERCIAL MANAGEMENT DATA, UNCOMMERCIAL CONTENT DATA OR UNCOMMERCIAL MANAGEMENT CONTENT DATA EXCEPT HEADER* *EACH DATA MAY FURTHER INCLUDE UNIQUE HEADER ||||||||

FIG. 8

| BYTE \ BIT | 7 (MSB) | 6 | 5 | 4 | 3 | 2 | 1 | 0 (LSB) |
|---|---|---|---|---|---|---|---|---|
| 21 TO 24 | colspan: DSRC DELIVERER ID ||||||||
| 25 TO 32 | CLASSIFICATION CODES (ADVERTISING FIRM ID, MATERIAL ID, PRODUCT NAME ID, etc.) ||||||||
| 33 | PUSH ID OF TITLE (OF ADVERTISEMENT, FOR EXAMPLE) ||||||||
| 34 | INFORMATION PROVISION START POSITION ||||||||
| 35 | INFORMATION PROVISION START DISTANCE ||||||||
| 36 | INFORMATION PROVIDING DIRECTION ||||||||
| 37 | ROAD TYPE ||||||||
| 38 | TARGET POINT POSITION ||||||||
| 39 | INFORMATION AVAILABLE PERIOD STARTING TIME ||||||||
| 40 | INFORMATION AVAILABLE PERIOD ENDING TIME ||||||||
| 41 TO 61 | BUSINESS DAYS AND BUSINESS HOURS ||||||||
| 62 | THE NUMBER ($N_1$) OF CONTENT DATA IN FIRST CONTENTS ||||||||
| 63 | PUSH ID NUMBER OF FIRST CONTENT DATA IN FIRST CONTENTS ||||||||
| ⋮ | ⋮ ||||||||
| $62+N_1$ | PUSH ID NUMBER OF $N_1$TH CONTENT DATA IN FIRST CONTENTS ||||||||
| $63+N_1$ | THE NUMBER ($N_2$) OF CONTENT DATA IN SECOND CONTENTS ||||||||
| $64+N_1$ | PUSH ID NUMBER OF FIRST CONTENT DATA IN SECOND CONTENTS ||||||||
| ⋮ | ⋮ ||||||||
| $63+N_1+N_2$ | PUSH ID NUMBER OF $N_2$TH CONTENT DATA IN SECOND CONTENTS ||||||||
| ⋮ | ⋮ ||||||||
| (OMITTED) | THE NUMBER ($N_j$) OF CONTENT DATA IN $j_{th}$ CONTENTS ||||||||
| (OMITTED) | PUSH ID NUMBER OF FIRST CONTENT DATA IN $j_{th}$ CONTENTS ||||||||
| ⋮ | ⋮ ||||||||
| (OMITTED) | PUSH ID NUMBER OF $N_j$TH CONTENT DATA IN $j_{th}$ CONTENTS ||||||||
| ⋮ | ⋮ ||||||||
| (OMITTED) | THE NUMBER ($N_{LAST}$) OF CONTENT DATA IN LAST CONTENTS ||||||||
| (OMITTED) | PUSH ID NUMBER OF FIRST CONTENT DATA IN LAST CONTENTS ||||||||
| ⋮ | ⋮ ||||||||
| (OMITTED) | PUSH ID NUMBER OF $N_{LAST}$TH CONTENT DATA IN LAST CONTENTS ||||||||

FIG. 9

| BYTE \ BIT | 7 (MSB) | 6 | 5 | 4 | 3 | 2 | 1 | 0 (LSB) |
|---|---|---|---|---|---|---|---|---|
| 41 | 0:00 – 0:59 | 1:00 – 1:59 | 2:00 – 2:59 | 3:00 – 3:59 | 4:00 – 4:59 | 5:00 – 5:59 | 6:00 – 6:59 | 7:00 – 7:59 |
| 42 | 8:00 – 8:59 | 9:00 – 9:59 | 10:00 – 10:59 | 11:00 – 11:59 | 12:00 – 12:59 | 13:00 – 13:59 | 14:00 – 14:59 | 15:00 – 15:59 |
| 43 | 16:00 – 16:59 | 17:00 – 17:59 | 18:00 – 18:59 | 19:00 – 19:59 | 20:00 – 20:59 | 21:00 – 21:59 | 22:00 – 22:59 | 23:00 – 23:59 |
| 44 | 0:00 – 0:59 | 1:00 – 1:59 | 2:00 – 2:59 | 3:00 – 3:59 | 4:00 – 4:59 | 5:00 – 5:59 | 6:00 – 6:59 | 7:00 – 7:59 |
| 45 | 8:00 – 8:59 | 9:00 – 9:59 | 10:00 – 10:59 | 11:00 – 11:59 | 12:00 – 12:59 | 13:00 – 13:59 | 14:00 – 14:59 | 15:00 – 15:59 |
| 46 | 16:00 – 16:59 | 17:00 – 17:59 | 18:00 – 18:59 | 19:00 – 19:59 | 20:00 – 20:59 | 21:00 – 21:59 | 22:00 – 22:59 | 23:00 – 23:59 |
| ... | | | | | | | | |
| 59 | 0:00 – 0:59 | 1:00 – 1:59 | 2:00 – 2:59 | 3:00 – 3:59 | 4:00 – 4:59 | 5:00 – 5:59 | 6:00 – 6:59 | 7:00 – 7:59 |
| 60 | 8:00 – 8:59 | 9:00 – 9:59 | 10:00 – 10:59 | 11:00 – 11:59 | 12:00 – 12:59 | 13:00 – 13:59 | 14:00 – 14:59 | 15:00 – 15:59 |
| 61 | 16:00 – 16:59 | 17:00 – 17:59 | 18:00 – 18:59 | 19:00 – 19:59 | 20:00 – 20:59 | 21:00 – 21:59 | 22:00 – 22:59 | 23:00 – 23:59 |

FIG. 12A

| PUSH ID = N |
| DISPLAY CONTROL DATA |

| PUSH ID = N+1 |
| TITLE DATA |

| PUSH ID = N+2 |
| FIRST CONTENT DATA IN FIRST CONTENTS |
| TEXT T1 |

| PUSH ID = N+3 |
| SECOND CONTENT DATA IN FIRST CONTENTS |
| AUDIO S1 |

| PUSH ID = N+4 |
| FIRST CONTENT DATA IN SECOND CONTENTS |
| TEXT T2 |

| PUSH ID = N+5 |
| SECOND CONTENT DATA IN SECOND CONTENTS |
| AUDIO S2 |

| PUSH ID = N+6 |
| THIRD CONTENT DATA IN SECOND CONTENTS |
| STILL IMAGE P1 |

| PUSH ID = N+7 |
| FOURTH CONTENT DATA IN SECOND CONTENTS |
| TEXT T3 |

| PUSH ID = N+8 |
| FIFTH CONTENT DATA IN SECOND CONTENTS |
| STILL IMAGE P2 |

FIG. 12B

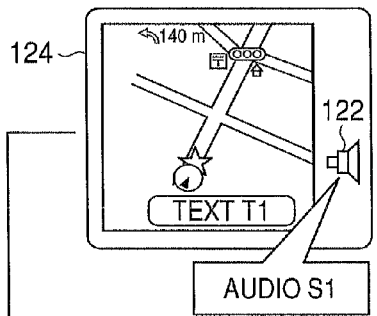

FIG. 12C

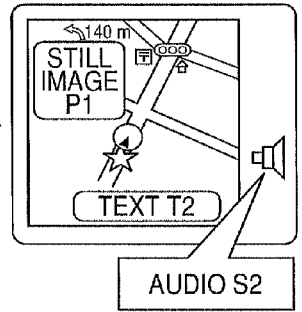

FIG. 12D

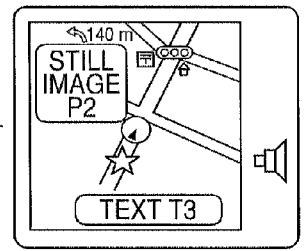

INFORMATION PROVIDING SYSTEM, INFORMATION PROVIDING METHOD, AND COMPUTER PROGRAM

TECHNICAL FIELD

The present invention relates to an information providing system, an information providing method and a computer program that are suitable for reproducing data as intended by a data delivering side.

BACKGROUND ART

Services that deliver various kinds of contents such as video, still images, audio and character data, such as car navigation systems, are becoming popular. Data delivering sides are seeking a mechanism, such as a car navigation system described in Patent Document 1, that can efficiently and effectively deliver the contents to a user who is a data receiving side (a car navigation vehicle-mounted device side).

Patent Document 1: Japanese Patent Application Laid-Open No. 2005-345325

Particularly in so-called push delivery in which information is automatically transmitted from a data delivering side to a data receiving side without a user operation instead of a user extracting (pulling) information, it is important for a data delivering side to have a user constantly changing its position watch and listen to a composite content combining the above described various kinds of contents at a timing intended by the data delivering side.

DISCLOSURE OF THE INVENTION

Problems to be Solved by the Invention

However, in conventional push delivery, under what condition a content delivered from a data delivering side to a data receiving side is watched and listened to is entirely up to a specification of a data receiver on the data receiving side. For example, in the simplest form, the specification is made so as to make a user watch and listen to a content as soon as that content is received in push delivery. This caused a problem that it is not always possible to make a user watch and listen to the content at a timing intended by a data delivering side.

The present invention addresses such a problem, and it is an object of the present invention to provide an information providing system, an information providing method and a computer program that are suitable for reproducing data as intended by a data delivering side.

Means for Solving the Problems

In order to achieve the object, an information providing system in accordance with the first perspective of the present invention comprises:

position identifying means for identifying a position of a vehicle-mounted device;

receiving means for receiving content data and reproduction control data indicating a position at which the content data is to be reproduced, the content data and the reproduction control data being transmitted from a roadside device to the vehicle-mounted device via wireless communication;

match detecting means for detecting that the position of the vehicle-mounted device identified by the position identifying means matches with the position at which the content data is to be reproduced which is indicated by the reproduction control data received at the receiving means; and data reproducing means for reproducing the content data if the match detecting means detects a match.

An information providing system in accordance with the second perspective of the present invention comprises:

at least one roadside device placed on the roadside for transmitting information signal via wireless communication; and at least one vehicle-mounted device for receiving the information signal transmitted from the at least one roadside device via the wireless communication, and reproducing the received information signal for output;

wherein the at least one roadside device is placed at the roadside along the road through which a vehicle passes, in parking spaces, or in the proximity of the road and the parking spaces, each of the at least one roadside device comprising: storage means for storing content data to be transmitted and reproduction control data indicating a condition required for reproducing the content data; and means for wirelessly transmitting the content data and the reproduction control data stored in the storage means;

each of the at least one vehicle-mounted device comprising: position identifying means for identifying a position of a vehicle-mounted device; receiving means for receiving the content data and the reproduction control data transmitted from the roadside device; match detecting means for determining whether the position of the vehicle-mounted device identified by the position identifying means matches with the condition required for reproducing the content data which the reproduction control data indicates; and data reproducing means for reproducing the content data if the match detecting means determines that there is a match.

An information providing system in accordance with the third perspective of the present invention is an information providing system which wirelessly transmits information signal to a vehicle-mounted device mounted in a vehicle which passes in the proximity and allows the vehicle-mounted device to reproduce the information signal, the information providing system comprising:

storage means, placed at the roadside along the road through which the vehicle passes, in parking spaces, or in the proximity of the road and the parking spaces, for storing content data to be transmitted and reproduction control data indicating a vehicle position at which the content data is to be reproduced by a vehicle-mounted device; and means for wirelessly transmitting the content data and the reproduction control data stored in the storage means.

The reproduction control data may include:

control data which controls a vehicle-mounted device which received content data so that the vehicle-mounted device reproduces the content data received; and start control timing data which controls a timing of reproduction caused by the control data.

The receiving means may comprise storage means for storing a plurality of pairs of content data received and corresponding reproduction control data, the position identifying means may comprise extracting means for extracting, when it is determined that one content data satisfies a reproduction condition, other content data which should be reproduced in parallel with the one content data from the content data stored in the storage means, and the data reproducing means may reproduce in parallel the one content data and the content data extracted by the extracting means.

The reproduction control data may include information indicating a plurality of reproduction positions, and the match detecting means may determine that a position of a vehicle-mounted device matches with a reproduction position indicated by the reproduction control data if it matches with any one of the plurality of reproduction positions indicated by the reproduction control data.

The content data may include advertising information of a store and business information representing business hours of the store as on/off of bit data by time period, the data reproducing means may comprise means for timing a current time, and the data reproducing means may determine whether the current time timed is in the business hours based on the business information, display the advertising information if the current time is in the business hours, and not display the advertising information if the current time is not in the business hours.

The content data may include advertising information of a store, and the data reproducing means may start reproducing content when a vehicle moved to an information providing position or for a distance defined by an information provision start distance and the moving direction of the vehicle matches with the direction toward the store according to the reproduction control data.

The content data may include information about a specific facility or position, reproduction start conditions defined by the reproduction control data may include a condition that a vehicle-mounted device is within a predetermined area based on the specific facility, and the data reproducing means may reproduce the content data when the conditions are satisfied.

The position identifying means may comprise traveling direction identifying means for identifying the traveling direction of a vehicle-mounted device, the reproduction control data may include information indicating a position and a direction as a reproduction condition, and the data reproducing means may identify and reproduce a content corresponding to condition information which substantially matches with a current position and the traveling direction.

The content data may include business information for business and traffic information, the reproduction control data may define each of a reproduction condition of the business information and a reproduction condition of the traffic information, and the data reproducing means may prioritize reproducing the traffic information when the reproduction condition of the business information matches with the reproduction condition of the traffic information.

The information providing system may comprise reproduction condition modifying means for detecting the reproduction condition of the traffic information and modifying the reproduction condition of the business information so that the reproduction condition of the business information does not match with the reproduction condition of the traffic information.

An information providing method in accordance with the fourth perspective of the present invention comprises the steps of:

identifying a position of a vehicle-mounted device;

receiving content data and reproduction control data indicating a position at which the content data is to be reproduced, the content data and the reproduction control data being transmitted from a roadside device to the vehicle-mounted device via wireless communication;

detecting that the position of the vehicle-mounted device identified by the position identifying means matches with the position at which the content data is to be reproduced which is indicated by the reproduction control data received at the receiving means; and reproducing the content data if a match is detected.

An information providing method in accordance with the fifth perspective of the present invention comprises the steps of:

wirelessly transmitting content data and reproduction control data indicating a condition required for reproducing the content data from a roadside device placed at the roadside along the road through which a vehicle passes, in parking spaces, or in the proximity of the road and the parking spaces;

identifying a position of a moving vehicle;

receiving the content data and the reproduction control data transmitted from the roadside device via wireless communication;

determining whether the identified position of the moving vehicle matches with the condition required for reproducing the content data which the reproduction control data indicates; and reproducing the content data on the moving vehicle side if it is determined that there is a match.

An information providing method in accordance with the sixth perspective of the present invention comprises the steps of:

storing content data to be transmitted and reproduction control data indicating a condition required for reproducing the content data; and wirelessly transmitting the content data and the reproduction control data from a vehicle-mounted device placed at the roadside along the road through which the vehicle passes, in parking spaces, or in the proximity of the road and the parking spaces.

A program in accordance with the seventh perspective of the present invention is for making a computer work as the above described information providing system or actualizing each of the above described functions.

An information providing system in accordance with the eighth perspective of the present invention comprises:

at least one roadside device placed at the roadside for wirelessly transmitting information signal; and at least one vehicle-mounted device for receiving and reproducing the information signal wirelessly transmitted from the roadside device, wherein the at least one roadside device is placed at the roadside along the road through which a vehicle passes, in parking spaces, or in the proximity of the road and the parking spaces, each of the at least one roadside device comprising:

storage means for storing content data to be transmitted and reproduction control data indicating a condition required for reproduction; and means for wirelessly transmitting the content data and the reproduction control data stored in the storage means, each of the at least one vehicle-mounted device comprising:

position acquiring means for acquiring a position of a vehicle-mounted device;

receiving means for receiving the content data and the reproduction control data from the roadside device;

determination means for determining whether the condition required for reproduction indicated by the reproduction control data received at the receiving means is satisfied on the basis of the position of the vehicle-mounted device acquired by the position acquiring means; and data reproducing means for reproducing the content data if the determination means determines that the condition required for reproduction is satisfied.

The content data may include information indicating a reproduction order of the content data and a combination of content data which is to be reproduced in parallel, and the data reproducing means may reproduce content data indicated by the combination among content data received by the receiving means in the reproduction order.

The vehicle-mounted device may further comprise:

storage means for storing a plurality of pairs of content data received by the receiving means and reproduction control data corresponding to the content data; and extracting means for extracting, if the determination means determines that a reproduction condition of content data stored in the storage means is satisfied, other content data which is to be reproduced in parallel with the content data from the storage means on the basis of the reproduction control data, and the data reproducing means may reproduce in parallel the content data and the other content data extracted by the extracting means.

The reproduction control data may include information indicating a plurality of reproduction positions, and the determination means may determine that the condition required for reproduction is satisfied if the position acquired by the position acquiring means matches with any one of the plurality of reproduction positions.

The reproduction control data may further include information indicating an information providing position indicating a position or area at which the content data is to be reproduced and a predetermined direction, the vehicle-mounted device may further comprise direction acquiring means for acquiring a moving direction thereof, and the determination means may determine that the condition required for reproduction is satisfied if a current position acquired by the position acquiring means is included in the information providing position and the moving direction acquired by the direction acquiring means matches with the predetermined direction.

The determination means may determine that a moving direction acquired by the direction acquiring means matches with the predetermined direction if the moving direction is included in a direction within a predetermined angle range centered on the predetermined direction.

The reproduction control data may further include information indicating a position of a specific facility and a predetermined distance, and the determination means may determine that the condition required for reproduction is satisfied if a current position acquired by the position acquiring means is included in a circle whose center is the position of the specific facility and whose radius is the predetermined distance.

The reproduction control data may include advertising information of a store which provides the content data and business information representing business hours of the store as on/off of bit data by time period, the vehicle-mounted device may further comprise timing means for timing a current time, and the data reproducing means may determine whether the current time timed by the timing means is included in the business hours, display the advertising information if it is determined that the current time is included in the business hours, and not display the advertising information if it is determined that the current time is not included in the business hours.

The content data may include traffic information and business information for business of the store, the reproduction control data may define each of a reproduction condition of the business information and a reproduction condition of the traffic information, and the data reproducing means may prioritize reproducing the traffic information if the reproduction condition of the business information matches with the reproduction condition of the traffic information.

The vehicle-mounted device may further comprise reproduction condition modifying means for modifying the reproduction condition of the business information so that the reproduction condition of the traffic information does not match with the reproduction condition of the business information.

The vehicle-mounted device may further comprise map information storage means for storing map information, the reproduction control data may include information indicating a position at which reproduction of the content data starts and a kind of a road on which the content data is to be reproduced, and the determination means may determine whether the condition required for reproduction is satisfied on the basis of the map information, the condition being that a current position indicated by the acquired position information matches with the position indicated by the reproduction control data and the current position is a road indicated by the kind of road on which the content data is to be reproduced.

The vehicle-mounted device may further comprise time acquiring means for acquiring a current time, the reproduction control data may include information indicating a position at which reproduction of the content data starts and a time period in which the content data is to be reproduced, and the determination means may determine whether the condition required for reproduction is satisfied, the condition being that a current position acquired by the position acquiring means matches with the position indicated by the reproduction control data and the current time acquired by the time acquiring means is included in the time period in which the content data is to be reproduced.

The vehicle-mounted device may further comprise map information storage means for storing map information, the reproduction control data may include information indicating a position of a specific facility and a predetermined distance, and the determination means may determine whether the condition required for reproduction is satisfied on the basis of the map information, the condition being that a current position acquired by the position acquiring means is included in a circle whose center is the position of the specific facility indicated by the reproduction control data and whose radius is the predetermined distance.

The vehicle-mounted device may further comprise map information storage means for storing map information, the reproduction control data may include information associating a position at which reproduction of the content data starts with a predetermined distance, and the determination means may determine whether the condition required for reproduction is satisfied on the basis of the map information, the condition being that a current position acquired by the position acquiring means is included in a circle whose center is the position indicated by the reproduction control data and whose radius is the predetermined distance.

The vehicle-mounted device may further comprise map information storage means for storing map information and traveling direction identifying means for identifying a traveling direction thereof, the reproduction control data may further include information indicating a predetermined direction, and the determination means may determine whether the condition required for reproduction is satisfied on the basis of the map information, the condition being that a current position acquired by the position acquiring means is included in a circle whose center is the position indicated by the reproduction control data and whose radius is the predetermined distance and the traveling direction identified by the traveling direction identifying means matches with the predetermined direction indicated by the reproduction control data.

The reproduction control data may further include reproduction information indicating whether reproduction of other content data is to be stopped to reproduce the content data when the other content data is being reproduced, and the data reproducing means may, if the condition required for reproduction is satisfied, (a) reproduce the content data when the other content data is not being reproduced, (b1) reproduce the content data after finishing reproducing the other content data when the other content data is being reproduced and the reproduction information indicates that reproduction of the other content data is to be stopped to reproduce the content data, and (b2) not reproduce the content data if the other content data is being reproduced and the reproduction information indicates that reproduction of the other content data is not to be stopped to reproduce the content data.

An information providing apparatus in accordance with the ninth perspective of the present invention comprises:

position acquiring means for acquiring a position of a vehicle-mounted device;

receiving means for receiving content data and reproduction control data indicating a condition required for reproduction, the content data and the reproduction control data being received from a roadside device placed at the roadside for wirelessly transmitting the content data and the reproduction control data;

determination means for determining whether the condition required for reproduction indicated by the reproduction control data received at the receiving means is satisfied on the basis of the position of the vehicle-mounted device acquired by the position acquiring means; and data reproducing means for reproducing the content data if the determination means determines that the condition required for reproduction is satisfied.

The reproduction control data may further include information indicating an information providing position indicating a position or area at which the content data is to be reproduced and a predetermined direction, the information providing apparatus may further comprise direction acquiring means for acquiring a moving direction of a vehicle-mounted device, and the determination means may determine that the condition required for reproduction is satisfied if a current position acquired by the position acquiring means is included in the information providing position and the moving direction acquired by the direction acquiring means matches with the predetermined direction.

The content data may include information indicating a reproduction order of the content data and a combination of content data which is to be reproduced in parallel, and the data reproducing means may reproduce content data indicated by the combination among content data received by the receiving means in the reproduction order.

An information providing method in accordance with the tenth perspective of the present invention comprises the steps of:

acquiring a position of a vehicle-mounted device;

receiving content data and reproduction control data indicating a condition required for reproduction, the content data and the reproduction control data being received from a roadside device placed at the roadside for wirelessly transmitting the content data and the reproduction control data;

determining whether the condition required for reproduction indicated by the reproduction control data received at the receiving step is satisfied on the basis of the position of the vehicle-mounted device acquired by the acquiring step; and reproducing the content data if it is determined in the determining step that the condition required for reproduction is satisfied.

A program in accordance with the eleventh perspective of the present invention is executed on a computer so as to allow the computer to operate as:

position acquiring means for acquiring a position of a vehicle-mounted device;

receiving means for receiving content data and reproduction control data indicating a condition required for reproduction, the content data and the reproduction control data being received from a roadside device placed at the roadside for wirelessly transmitting the content data and the reproduction control data;

determination means for determining whether the condition required for reproduction indicated by the reproduction control data received at the receiving means is satisfied on the basis of the position of the vehicle-mounted device acquired by the position acquiring means; and data reproducing means for reproducing the content data if the determination means determines that the condition required for reproducing the content data is satisfied.

EFFECTS OF THE INVENTION

According to the present invention, an information providing system, an information providing and reproducing method and a program that are suitable for reproducing data as intended by a data delivering side can be provided.

BRIEF DESCRIPTION OF THE DRAWINGS

FIG. 5 is a diagram for describing data reproduction processing performed by a vehicle-mounted device;

FIG. 6 is a diagram showing a sample configuration of data stored in a header portion of content data and common to any data;

FIG. 8 is a diagram showing a sample configuration of data stored in a header portion of display control data;

FIG. 9 is a diagram showing a sample configuration of data stored in a portion of a header portion of display control data;

FIG. 12(a) is a diagram schematically showing data acquired, and FIGS. 12(b) to 12(d) are diagrams schematically showing an image and an audio reproduced from a monitor and a speaker in response to the data;

FIG. 13 is a schematic diagram for describing a relationship between a vehicle-mounted device and various apparatuses or the like placed on a roadside or the like;

Figure 1:
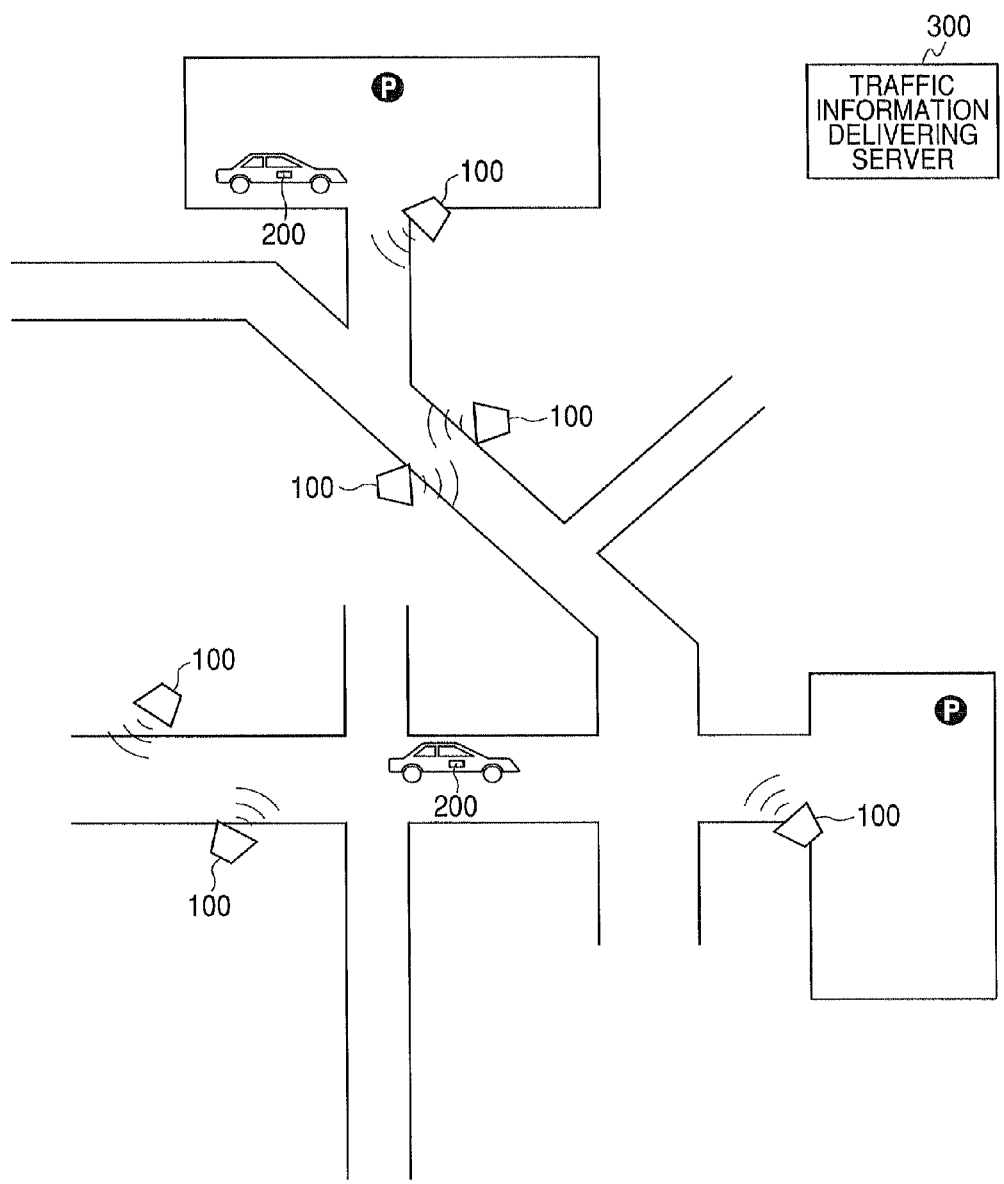
FIG. 1 is a diagram for describing the overall configuration of an information providing system.

DESCRIPTION OF SYMBOLS 100 roadside device
101 wireless communication unit
102 communication control unit
103 storage apparatus
104 control unit
105 ROM
106 RAM
107 system bus
200 vehicle-mounted device
201 communication unit
201a GPS module
201b VICS module
202 audio processing unit
203 output unit
204 operating unit
205 I/O apparatus
206 storage apparatus
207 control unit
208 ROM
209 RAM
210 system bus
225 a group of sensors
251 data acquiring unit
252 parallel reproduction determining unit
253 data reproducing unit
254 position detecting unit for detecting a position of a vehicle-mounted device
255 position match determining unit
256 traveling direction detecting unit
257 direction match determining unit
300 traffic information delivering server
301 input unit
302 output unit
303, 304 communication control unit
305 storage unit
306 control unit
307 ROM
308 RAM

BEST MODES FOR CARRYING OUT THE INVENTION

An information providing system in accordance with embodiments of the present invention will now be described, taking an ITS (Intelligent Transport Systems) system as an example.

[Embodiment 1]

An ITS system comprises, as shown in FIG. 1, a roadside device 100 placed in the proximity of a place through which a vehicle passes such as a road or parking spaces, a vehicle-mounted device 200 mounted on a vehicle for communicating with the roadside device 100 to provide traffic information or the like to a passenger in a vehicle, and a traffic information delivering server 300 for generating various information to supply to the roadside device 100.

Figure 2:
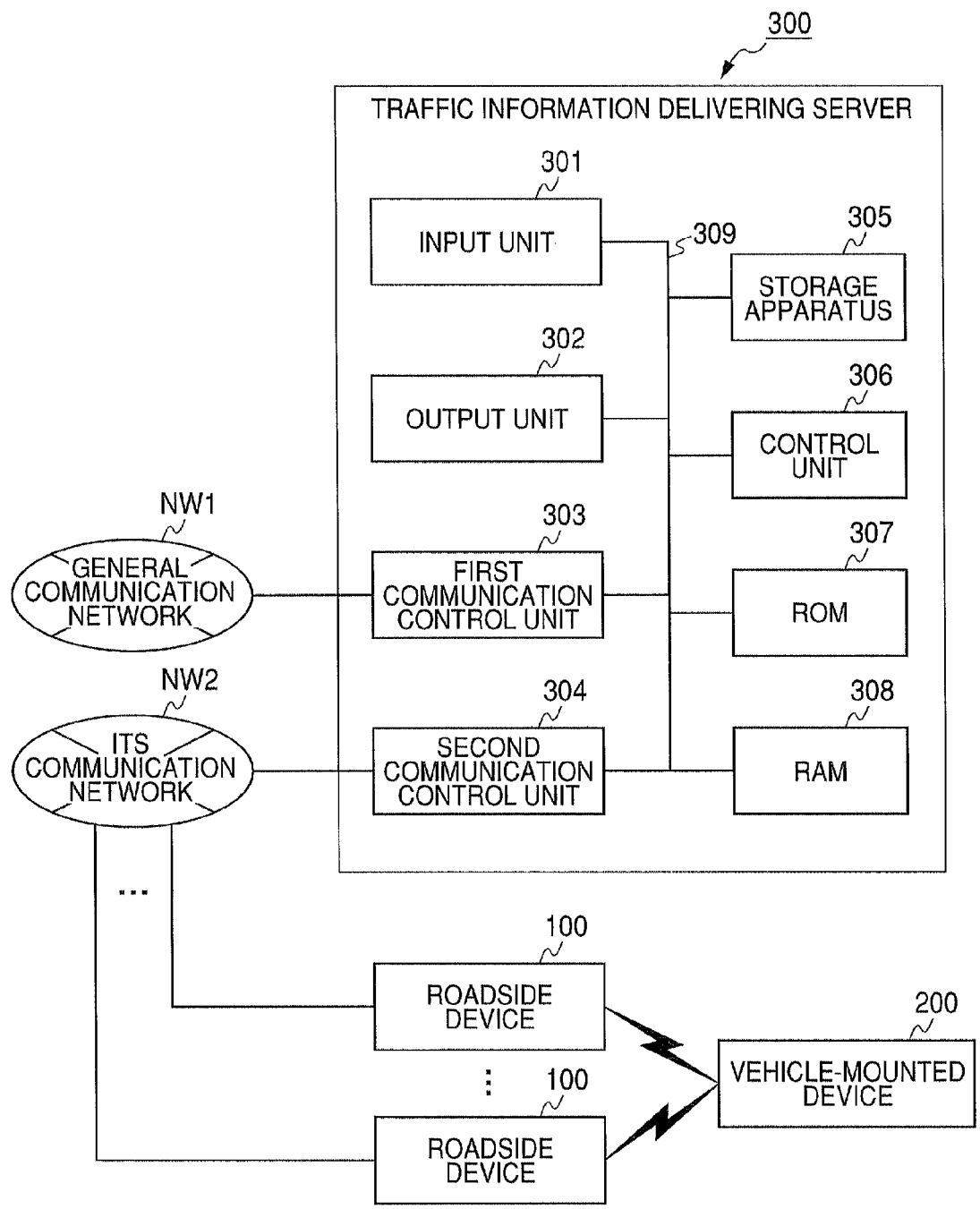
FIG. 2 is a diagram for describing the configuration of a traffic information server.

The traffic information delivering server 300 is an apparatus for generating and delivering traffic information on a basis of each roadside device 100, and comprises an input unit 301, an output unit 302, communication control units 303 and 304, a storage apparatus 305, a control unit 306, a ROM (Read Only Memory) 307, a RAM (Random Access Memory) 308 and a system bus 309, as shown in FIG. 2.

The input unit 301 comprises a keyboard, a mouse, an input interface, etc. and inputs various data and instructions.

The output unit 302 comprises a display apparatus and the like and displays data, a message, etc.

The first communication control unit 303 communicates with an external apparatus through a general communication network NW1 such as a telephone line and the internet and acquires various information.

The second communication control unit 304 is connected to a plurality of the roadside devices 100 through an ITS network, and transmits traffic information to each of the roadside devices 100. Also, the second communication control unit 304 collects through an ITS communication network NW2 information acquired by the roadside devices 100 by communicating with the vehicle-mounted device 200, for example.

The storage apparatus 305 comprises a hard disk apparatus and the like and stores various traffic information.

Also, the storage apparatus 305 stores the position, the address, etc. of each roadside device 100 along with the geographic information of the proximity thereof.

The control unit 306 comprises a processor and the like and controls the overall behavior of the traffic information delivering server 300. Also, the control unit 306 creates for each roadside device 100 information to be delivered from the proximity of that roadside device 100 based on various information stored in the storage apparatus 305, and supplies the information to each roadside device 100 via the second communication unit 304 and the ITS communication network NW2. The configuration of the information generated and transmitted by the control unit 306 will be described with reference to FIGS. 6 to 9.

The ROM 307 stores an operating system (OS) and various data necessary for controlling the overall behavior of the traffic information delivering server 300 at large.

The RAM 308 functions as a work area of the control unit 306.

The system bus 309 is a transmission path for transferring an instruction and data between each of the above described units.

Each roadside device 100 shown in FIG. 1 comprises a so-called radio wave beacon, an optical beacon, etc., and is placed in the proximity of a road, parking spaces, etc. to transmit a delivery of traffic information to the vehicle-mounted device 200 of a vehicle passing through the proximity thereof.

Each roadside device 100 stores content data and reproduction control data to be transmitted, and wirelessly transmits the content data and the reproduction control data stored therein.

The reproduction control data is data for instructing a condition and a position for reproducing the content data. Also, the content data and the reproduction control data respectively include header information as described below.

Figure 3:
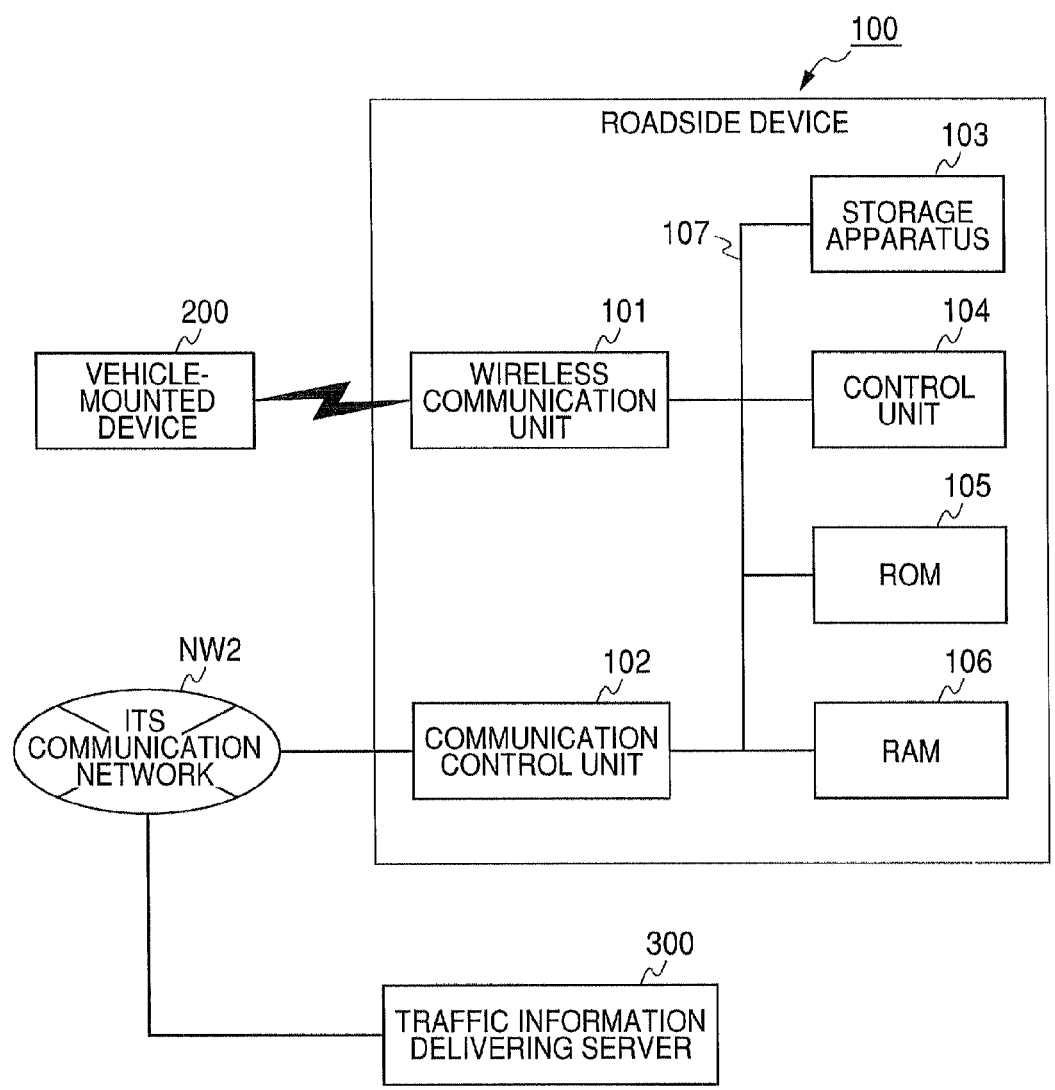
FIG. 3 is a diagram showing a sample configuration of a roadside device.

In order to achieve such functionality, the roadside device 100 comprises a wireless communication unit 101, a communication control unit 102, a storage apparatus 103, a control unit 104, a ROM (Read Only Memory) 105, a RAM (Random Access Memory) 106 and a system bus 107, as shown in FIG. 3.

The wireless communication unit 101 communicates information with the vehicle-mounted device 200 mounted on a vehicle passing through the proximity thereof by a wireless signal such as a radio wave signal and an optical signal. The wireless communication unit 101 transmits, for example, traffic information provided from the traffic information delivering server 300 to the vehicle-mounted device 200. Also, the wireless communication unit 101 acquires information such as a vehicle ID transmitted from the vehicle-mounted device 200.

The communication control unit 102 is connected to the traffic information delivering server 300 through the ITS communication network NW2, and receives traffic information transmitted from the traffic information delivering server 300. Also, the communication control unit 102 provides traffic information acquired thereby to the traffic information delivering server 300.

The storage apparatus 103 stores the traffic information received from the traffic information delivering server 300 and the traffic information unique thereto.

The control unit 104 comprises a processor and the like and controls the overall behavior of the roadside device 100 at large. Particularly, the control unit 104 transmits traffic information stored in the storage apparatus 103 from the wireless communication unit 101, and stores information acquired through the wireless communication unit 101 in the storage apparatus 103. Also, the control unit 104 transmits traffic information acquired thereby and stored in the storage apparatus 103 to the traffic information delivering server 300 through the communication control unit 102 and the ITS communication network NW2, and stores information acquired from the traffic information delivering server 300 through the communication control unit 102 in the storage apparatus 103.

The ROM 105 stores an operating system (OS) and various data necessary for controlling the overall behavior of the roadside device 100 at large.

The RAM 106 functions as a work area of the control unit 104.

The system bus 107 is a transmission path for transferring an instruction and data between each of the above described units.

The vehicle-mounted device 200 shown in FIG. 1 is mounted on each vehicle, and integrally configured with a car navigation apparatus, for example. Along with common car navigation functionality, the vehicle-mounted device 200 comprises functionality for reproducing and informing traffic information transmitted from the roadside device 100.

For this reason, the vehicle-mounted device 200 identifies the position thereof, and receives content data and reproduction control data indicating a position at which the content data is to be reproduced, the content data and the reproduction control data being transmitted from the roadside device 100 via wireless communication. And if it is detected that the position thereof identified matches with the reproduction position indicated by the reproduction control data received, the vehicle-mounted device 200 reproduces the content data.

Figure 4:
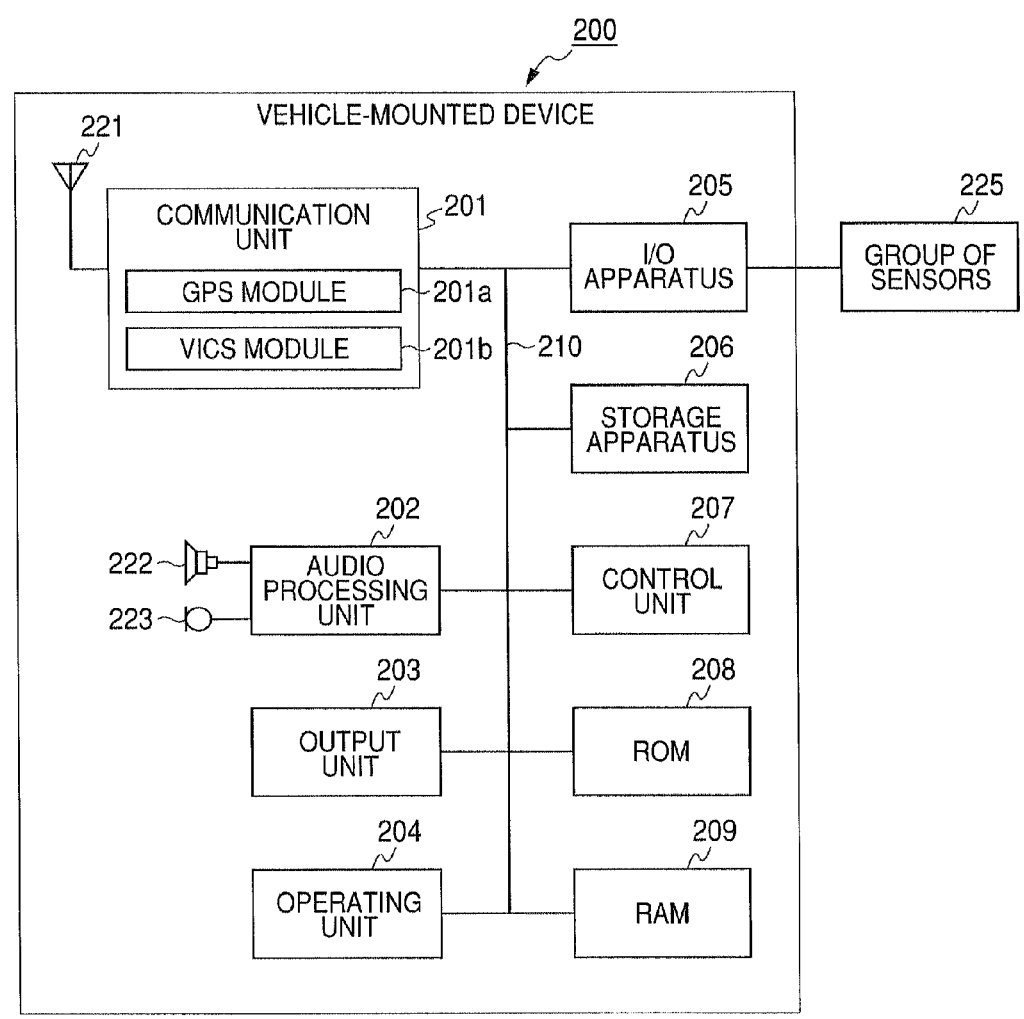
FIG. 4 is a diagram for describing the configuration of a vehicle-mounted device.

The vehicle-mounted device 200 comprises a communication unit 201, an audio processing unit 202, an output unit 203, an operating unit 204, an I/O (Input/Output) apparatus 205, a storage apparatus 206, a control unit 207, a ROM (Read Only Memory) 208, a RAM (Random Access Memory) 209 and a system bus 210, as shown in FIG. 4.

The communication unit 201 comprises a GPS (Global Positioning System) module 201a and a VICS (Vehicle Information and Communication System) module 201b.

The GPS module 201a receives a GPS radio wave from a plurality of GPS satellites to supply to the control unit 207.

The VICS module 201b communicates with the roadside device 100 by the DSRC (Dedicated Short Range Communication) method.

The audio processing unit 202 converts a digital audio signal input from the control unit 207 to an analog audio signal with a D/A converter (not shown) to output to a speaker 222. Also, the audio processing unit 202 converts audio input from a microphone 223 to a digital audio signal with an A/D converter (not shown) to input to the control unit 207. This enables a user to listen to navigation audio and input audio.

The output unit 203 comprises a monitor apparatus, and displays a navigation image and a TV image acquired by the communication unit 201, a map image pre-stored in the storage apparatus 206 and the like, etc.

The operating unit 204 comprises a touch-screen input apparatus and the like, and generates an instruction input signal based on an instruction input from a user to input to the control unit 207.

The I/O apparatus 205 comprises a DVD-ROM (Digital Versatile Disk-Read Only Memory) drive, and reads data from a DVD-ROM or a CD-ROM in which predefined map information or the like is stored to input to the control unit 207.

Also, the I/O apparatus 205 inputs a detection signal of a group of sensors 225 such as a speed sensor, a running distance sensor and an orientation sensor to supply to the control unit 207.

The storage apparatus 206 comprises a hard disk drive (HDD), and stores predefined map information (map data) and various setting information. The storage apparatus 206 may comprise other memory such as a memory card. The control unit 207 may read map information as needed from a storage media such as a DVD-ROM in which the map information is stored, or pre-read the map information from the storage media to write to (install in) the storage apparatus 206.

The control unit 207 comprises a CPU (Central Processing Unit), and controls the overall behavior of the vehicle-mounted device 200 at large.

For example, the control unit 207 identifies the current position thereof based on a GPS signal received via the GPS module 201a.

Also, the control unit 207 captures the output of a direction sensor included in the group of sensors 225 via the I/O apparatus 205, and identifies the current traveling direction of a vehicle. Also, the control unit 207 calculates a running distance from the output of the distance sensor.

Also, the control unit 207 receives traffic information from the roadside device 100 via the VICS module 201b, and reproduces the received traffic information based on reproduction timing control data (parameter) included in the received traffic information.

The control unit 207 may comprises a coprocessor or the like.

The ROM 208 stores a program of an operating system (OS) and various data necessary for controlling the overall behavior of the vehicle-mounted device 200 at large.

The RAM 209 is for temporally storing data and a program, and retains data acquired by the communication unit 201, data read from a DVD-ROM, etc. Also, the control unit 207 uses the RAM 209 as a work memory.

The system bus 210 is a transmission path for interconnecting each of the above described units and transferring an instruction and data.

The vehicle-mounted device 200 functionally comprises a data acquiring unit 251, a parallel reproduction determining unit 252, a data reproducing unit 253, a position detecting unit for detecting a position of a vehicle-mounted device 254, a position match determining unit 255, a traveling direction detecting unit 256 and a direction match determining unit 257, as shown in FIG. 5.

The data acquiring unit 251 acquires from the roadside device 100 one or a plurality of content data which should be reproduced. The content data includes a control parameter indicating a condition required for reproducing the content data.

The detail of the content will be described below with reference to FIG. 6.

The content data includes, for example, moving image data such as in MPEG (Moving Picture Experts Group) format, still image data such as in JPEG (Joint Photographic Experts Group) format, audio data in TTS (Text-to-Speech) format, and text data such as character information.

The data acquiring unit 251 acquires these moving image data, still image data, audio data, text data, etc. by decoding data received by the communication unit 201 or reading data stored in the storage apparatus 206 at a predetermined timing.

The data acquiring unit 251 is composed of the cooperative operation of the control unit 207, the communication unit 201 and the storage apparatus 206.

The data reproducing unit 253 reproduces the content data. When reproducing a content, the data reproducing unit 253 determines whether a plurality of contents need to be reproduced in parallel based on the determination of the parallel reproduction determining unit 252, and determines whether a condition required for reproduction appended to each content is satisfied from the determination result of the position match determining unit 255 and the direction match determining unit 257, and then reproduce the content.

The position match determining unit 255 is composed of the control unit 207, and when a content acquired by the data acquiring unit 251 specifies a position at which the content is to be reproduced, the position match determining unit 255 compares the position indicated by control information and the position of a vehicle-mounted device detected by the position detecting unit for detecting a position of a vehicle-mounted device 254 and gives the data reproducing unit 253 a permission for reproducing data if the positions match (or are within a predetermined margin of error).

On the other hand, the direction match determining unit 257 is composed of the control unit 207, and when a content acquired by the data acquiring unit 251 specifies a traveling direction of a vehicle as a condition for reproducing the content, the direction match determining unit 257 compares the direction indicated by control information and the traveling direction of a vehicle on which the vehicle-mounted device 200 is mounted and gives the data reproducing unit 253 a permission for reproducing data if the directions match (or are within a predetermined margin of error).

The position detecting unit for detecting a position of a vehicle-mounted device 254 processes a GPS signal to detect the current position of the vehicle-mounted device. The position detecting unit for detecting a position of a vehicle-mounted device 254 is composed of the portions of the communication unit 201 and the control unit 207 that process a GPS signal.

The traveling direction detecting unit 256 is a function for detecting a traveling direction of a vehicle, and composed of the direction sensor, the I/O unit and the control unit 207.

Content data which should be reproduced also includes a combination of data to be reproduced concurrently or in parallel. This may be, for example, a combination of the map image data of a display area and the audio data describing tourist information of that display area. The concurrency referred herein does not necessarily mean an exact coincidence of time, and it is acceptable if at least parts of reproduction timings of data are overlapping. Generally, a content providing side (data delivering side) creates image data and audio data based on the assumption that they will be concurrently reproduced.

However, there may be a gap between timings of acquiring a combination of data which should be reproduced concurrently. Thus, in the present embodiment, the content data is provided a header portion as described above, and delivered with a condition required for reproduction set in the header portion. The vehicle-mounted device reproduces a content in accordance with the condition required for reproduction. This enables to reproduce a content as intended by a content delivering side.

Figure 7:
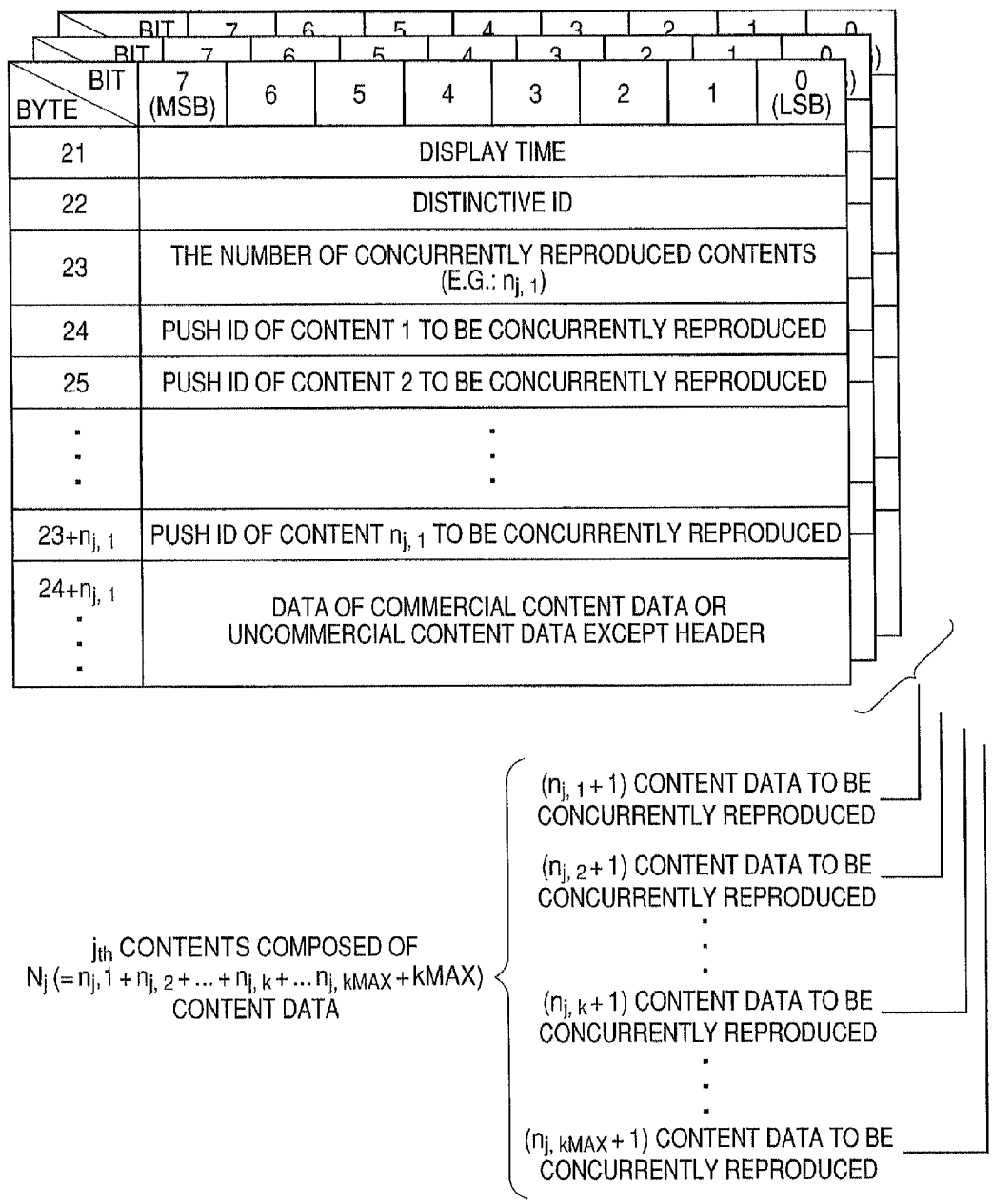
FIG. 7 is a diagram showing a sample configuration of data stored in a header portion of content data except display control data.

FIG. 6 shows the header information of the content data and the reproduction control data, and FIG. 7 shows the configuration of data following the header information shown in FIG. 6 as the content data.

This data includes portions of still image data, moving image data, audio data, text data, etc. constituting the content data.

Also, FIG. 8 shows the configuration of data following the header information shown in FIG. 6 as the reproduction control data. This data includes things such as which content is reproduced when.

As shown in FIG. 6, the header information includes information such as PUSH ID, Language ID, Application Type, Content Type, PRIORITY, Content Size and Push Body Length.

Of the header information shown in FIG. 6, the Language ID is the information indicating a language type of the content data to be delivered and has a data size of 2 bytes.

As the Application Type, any content type can be specified.

The Content Type is the information indicating a type of data, and indicates, for example, whether the data is moving image data such as the one in MPEG format, still image data such as the one in JPEG format, or text data such as character information. This is the information necessary for the roadside device 100 to make data be properly reproduced (for example, avoid image data being displayed as text characters).

Audio data in TTS (Text-to-Speech) format is also made describable in the Content Type using "0x28" in hexadecimal notation, for example.

The fact that the data is the display control data is also made describable in Contents Type using "0x91" in hexadecimal notation, for example. Simply put, the display control data is TOC (Text Of Contents). In other words, "data itself (text, sound, image, etc.)" and "data about data (TOC)" are treated as equal data as for at least the header portion shown in FIG. 6.

The Content Size and the Push Body Length are information necessary for enabling the vehicle-mounted device 200 to reproduce data smoothly.

The PRIORITY is the information indicating a priority order in which the vehicle-mounted device 200 reproduces data push-delivered from a content delivering side. The PRIORITY has a data size of 2 bits in the present embodiment, and an integer from 0 to 3 is set thereto.

PRIORITY="3" is the highest priority with which the content data push-delivered is reproduced by interrupting a process that the vehicle-mounted device 200 is currently running.

PRIORITY="2" indicates that the content data push-delivered is reproduced after a process that the vehicle-mounted device 200 is currently running is finished.

PRIORITY="0" indicates that it is general push delivery and the content data is reproduced or not reproduced in a manner set by a user.

PRIORITY="1" is reserved for future use.

The PUSH ID is an identification code appended to each content data, using a number which can be represented in one byte (for example, an integer from 0 to 255). Also, a combination of content data that should be reproduced concurrently is one of the several kinds of combination of moving image data, still image data, audio data, text data, etc., and the number of data that should be reproduced concurrently is usually from several to several tenth. Thus, by cyclically using unique numbers, the PUSH ID can be represented in one byte. In the present embodiment, the PUSH ID is used as a part of a file name of data, and by acquiring a file name of data the PUSH ID of that data can be identified.

Although other various pieces of information that are also necessary are described in the header portion, they are described in FIG. 6 as just "(Reserved)" for facilitating understanding.

As described above, as for the content data, the things shown in FIG. 7 (from the 21st byte to the 24+$n_{j,k}$th byte) are recorded in the header portion subsequent to the information shown in FIG. 6 (from the first byte to the 20th byte).

A DISPLAYTIME is the information indicating a display time for which the output unit 203 displays a reproduced screen of the content data, and has a data size of 8 bits. That is, an integer from 0 to 255 is set to the DISPLAYTIME, and a unit of the DISPLAYTIME is "second". DISPLAYTIME="0" is reserved for future use. DISPLAYTIME="255" indicates that displaying is continued until next push delivery is performed or an operation instruction is input to the operating unit 204.

As a method of specifying the DISPLAYTIME, a display time itself may be specified. Also, there is an instruction to delegate to the specification of the vehicle-mounted device 200 to specify the DISPLAYTIME. Alternatively, a reproduction time of the content data may be determined as a predetermined function of the reproduction time of other content data. For example, if the content data is text, and other content data of audio is intended to be reproduced concurrently, the text may be displayed until speech of the audio finishes.

A Distinctive ID shown in FIG. 8 is the number for distinguishing whether the content data is an icon or a still image, for example. If the content data is an icon, it must be conveyed to a data reproducing apparatus that the content data needs to be kept displaying at a position corresponding to, for example, a predetermined address on a map displayed on the output unit of the vehicle-mounted device 200 which is a car navigation vehicle-mounted apparatus. On the other hand, if the content data is a still image, it must be conveyed to a data reproducing apparatus that the content data needs to be displayed as a popup at a predetermined position with reference to the frame of a monitor. Alternatively, the Distinctive ID is used, for example, to distinguish whether the content data of text is the one that should be displayed as a popup on the monitor or a title (for example, a title of an advertisement) which is not directly displayed but is the name appended to a content so that a user can easily organize data in the storage apparatus 206 later. The Distinctive ID contributes to such conveyance.

As described above, a lot of content data is intended by a data delivering side to be reproduced concurrently with other content data. Thus, as shown in FIG. 7, in the header of the content data other than the display control data, things that can be used for identifying other content data that should be reproduced concurrently with the content data are recorded starting from the 23rd byte.

The content data other than the display control data is organized in a hierarchical structure. That is, it can be first categorized into groups of First Contents, Second Contents, ..., $j_{th}$ Contents, ..., and Last Contents in order of time at which the content data should be reproduced. Within each Contents ($j_{th}$ Contents), ($n_{j,1}$+1) content data that should be concurrently reproduced first, ($n_{j,2}$+1) content data that should be concurrently reproduced next, ..., and ($n_{j,kMAX}$+1) content data that should be concurrently reproduced last, totaling ($n_{j,1}$+ ... +$n_{j,kmax}$+Kmax) content data, exist mainly in order of time (the order of them may depend on a user's selection performed via the operating unit 204).

Data having no other data that should be reproduced concurrently (that is, data that should be reproduced alone) may constitute one Contents by itself.

If the $j_{th}$ Contents is composed of $N_j$ content data, $N_j$ equals $n_{j,1}$+ ... +$n_{j,kmax}$+kmax, as described above.

FIG. 7 shows a sample configuration of the header of the content data that should be concurrently reproduced first in the $j_{th}$ Contents. In FIG. 7, three content data are schematically described as the ones that are concurrently reproduced first. In this case, the number of other contents that should be concurrently reproduced is $n_{j,1}$=2(=3-1).

The number of other contents that are concurrently reproduced is recorded in the 23rd byte. In the case of FIG. 7, as an illustration for facilitating understanding, two content data are drawn behind the first content data so as to be overlapping with the first content data, and as described above the first content data is intended by a data delivering side to be concurrently reproduced with the two content data behind thereof. Therefore, "2(=$n_{j,1}$)" is recorded in the 23rd byte. In the present embodiment, since one byte is reserved for a data size of the number of concurrently reproduced contents, up to 255 content data can be set as one combination of data that should be concurrently reproduced. If the number of concurrently reproduced contents is "0", it indicates that the content data is data that should be reproduced alone. For example, if the content data transmitted from a data delivering side (content delivering side) is in HTML (Hyper Text Markup Language) format, links can be made to up to 255 images and the like.

Starting from the 24th byte, Push IDs of other content data in a group of data which is a combination of data that should be concurrently reproduced are sequentially recorded. In the present embodiment, since the data size of the Push ID is one byte as described above, one byte is needed for specifying one Push ID. Ultimately, in order to describe all of Push IDs of other contents that should be concurrently reproduced (in the case of FIG. 7, Push IDs of the content 1 and the content 2 that are the other two contents to be concurrently reproduced), the 23+$n_{j,1}$th byte (in the case of FIG. 7, the 25th byte since $n_{j,1}$=2) and above become a header.

Next, as for the display control data, things shown in FIG. 8, such as which content is reproduced when, are recorded following the header information shown in FIG. 6. FIG. 8 shows data starting from the 21st byte.

A DSRC deliverer ID is the information for indicating a source of the content data, or identifying a data delivering side, and has a data size of four bytes. Also, a communication method between the vehicle-mounted device 200 and the roadside device 100 is the DSRC (Dedicated Short Range Communication) which is commonly used in push delivery. For example, the control unit 207 of the vehicle-mounted device 200 can allow/disallow receiving the content data delivered from a specific source based on the DSRC. This enables, for example, a driver to prevent a content delivered from a data delivering side which deals in contents for adults from being displayed on a monitor when a minor is also riding in a vehicle on which the vehicle-mounted device 200 as a car navigation vehicle-mounted apparatus is mounted. Based on the DSRC deliverer ID of the content data acquired in push delivery and a DSRC deliverer ID list (not shown) pre-stored in the storage apparatus 206, the control unit 207 can determine whether the content data should be displayed on a monitor.

From the 25th byte to the 32nd byte, classification codes are recorded. The classification codes include, for example, a advertising firm ID for specifying a advertising firm which is a sponsor of a data delivering side, a material ID indicating a material of a product sold in a service providing spot to which a data delivering side intends to lead a driver, and an ID of a name of a product sold in the service providing spot. As with the DSRC deliverer ID described above, these IDs may be used for screening out (filtering) contents by a driver. For example, when looking for a restaurant where noodles are served, a driver can eliminate restaurants where breads and rice are served based on the IDs and display on a monitor screen of the vehicle-mounted device 200 only the data delivered by restaurants where noodles are served.

Other various classification codes may be used. For example, if a category ID having a tree structure is defined, a driver looking for a hospital on a holiday can achieve his or her object by first selecting "life information" from a top menu and then selecting "today's duty doctor" in that category, for example, via the operating unit 204. Things that may change in accordance with a day of the week or a period of time, such as the duty doctor on a holiday described above, are recorded in the header of the display control data using "information validity period starting time", "information validity period ending time" and "business day and business hour" as described below. Thus, in the filtering that the control unit 207 performs in cooperation with the storage apparatus 206 and the like according to an operating program written in the ROM 208, things other than the classification codes recorded in the header of the display control data are also referenced.

The classification codes may also be in a form which is easy to use for notifying of a discount sale limitedly conducted in a predetermined time period at a service providing spot which is the base of a data delivering side, or requesting use information of a coupon.

In the display control data, the Push ID of a title is recorded. This title does not necessarily have to be watched or listened to by a driver via a monitor or the speaker 222, and only have to be stored in the storage apparatus 206 of the vehicle-mounted device 200. In push delivery, a driver usually does not have to pay attention to what kind of information was transmitted from a roadside device, but if he or she wants to organize and screen out data stored in the storage apparatus 206 via a touch screen and the operating unit 204, that title can be used as a clue (a list of titles can be displayed on a monitor).

The display control data includes an information provision start position. The information provision start position is a position set by a data delivering side, and specified by a combination of longitude and latitude, for example. It is advisable for a data delivering side to set the information provision start position between a service providing spot which is the base thereof and nearby parking spaces at which a roadside device is already placed and push delivery of the content data delivered by the data delivering side is expected to be performed. This is because, after push delivery is performed to the vehicle-mounted device 200 mounted on a vehicle which entered the parking spaces since a driver wanted to take a rest, for example, and the content data is stored in the storage apparatus 206, if the driver happens to move the vehicle in an approximate direction toward the service delivering spot, and the advertisement of the service providing spot is displayed on a monitor of a data reproducing apparatus as soon as the vehicle reached the information provision start position, the possibility that the driver drops in the service providing spot before going to an original destination would be high.

The number of information provision start positions is not limited to one, and a plurality of information provision start positions may be set so as to surround a service providing spot. By doing so, it is possible to lead a driver to a service providing spot from every direction.

Although one byte is used for the information provision start position in FIG. 8, it is just an illustration, and if a number of information provision start positions should be set, more storage capacity can be allocated so that all information of those positions can be stored.

The display control data includes an information provision start distance. This is for also enabling reproducing data as soon as a vehicle has moved the distance after receiving push delivery from the roadside device 100. In the above described example, if the information provision start distance is set to a half of the distance between the parking spaces at which a roadside device is already placed and the service providing spot, for example, it may be possible to make a driver watch and listen to the content at an advantageous timing for the data delivering side. Compared to the case in which the above described information provision start position is used as a trigger for starting reproducing data, this method may be disadvantageous when the vehicle traveled in a direction opposite to the service providing spot after leaving the parking spaces, which causes the method to be meaningless or incur the driver's displeasure. However, this method is advantageous in that a smaller data size is required compared to the case in which coordinates are specified.

The display control data includes an information providing direction. If the data delivering side has set the information provision start positions (the 34th byte) so as to surround a service providing spot as described above, the vehicle-mounted device 200 starts reproducing the content data even when a driver has already received service at the service providing spot and the vehicle started to travel in a direction opposite to the service providing spot (that is, a direction in which the vehicle moves away from the service providing spot), for example. The same is true when the driver doesn't want to receive the service and moves away from the service providing spot. If reproduction of the content data starts even in such cases, the driver may feel annoyed and end up having an unpleasing impression about the data delivering side. This isn't of benefit to the data delivering side. Thus, in the present embodiment, in addition to the information provision start position, the information providing direction can be specified. The information providing direction may be an approximate direction, such as north, south, east and west. For a data delivering side, it is advisable to specify as the information providing direction a direction from an information providing point toward a service providing spot which is the base of the data delivering side. For the vehicle-mounted device 200, it is advisable to not give a permission for reproducing data to the data reproducing unit 253 just because the position match determining unit 255 (FIG. 5) determined that the position of the vehicle-mounted device matches with the information provision start position, but allow the data reproducing unit 253 to start reproducing data after querying the direction match determining unit 257 and obtaining a determination result that the traveling direction of the vehicle-mounted device matched with the information providing direction. In addition to the above described directions, the information providing direction may be a direction represented as upbound or downbound, a direction in which a road runs (for example, an approximate direction using a place name or a proper name such as "a direction of Shibuya"), etc.

The display control data includes a road type. This information may be used in various ways. For example, by recording information about a one-way road, it is possible to make the data reproducing unit 253 not reproduce data even when a vehicle reached the above described information provision start position if the position happens to be set on a road on which the vehicle can only move in a direction opposite to the service providing spot. As described above, reproducing data in a vehicle moving away from a service providing spot may not be of benefit to a data delivering side. In addition to the above described road, a road type may be a general road, an expressway, a toll road, a bypass, a national/prefectural/municipal road, a tunnel, a bridge, etc. Also, a road type may be the one that is distinguished by a number of lanes (such as two lanes each way), width, details of traffic regulation (such as speed, lanes, time, season, a type of a vehicle, width of a vehicle, height of a vehicle, and weight), with or without pavement, the volume of traffic (such as a road which statistically tends to be jammed), ascent/descent/flatness, an occurrence frequency of traffic accidents, etc. Furthermore, a road type may be a rough road, a winding road, a road nearest a coast line, etc., and also freely set by a data delivering side (content data providing side).

The display control data includes a target point position, or a geographic location used by a data delivering side as the base of service delivery. This position is represented by a combination of longitude and latitude, for example. If a distance is subsequently recorded, for example, effort of separately defining the above described information providing position can be avoided by making data reproduction be performed at a timing when the vehicle-mounted device 200 reached a circumference of a circle whose center is a position of a service providing spot (the target point position) and which has a predetermined radius (the distance). That is, a data area for specifying the length of the radius may be further provided in the display control data, and the position match determining unit 255 may determine whether the current position of the vehicle-mounted device 200 is far from the target point position for a distance indicated by the radius. By doing so, effort of separately defining the above described information provision start position can be avoided. For example, instead of separately specifying a plurality of information provision start positions, specification such as "positions within X meters from the target point position" can be made, enabling specifying more reproduction start positions with less data amount. In other words, specifying one target point position substantially equals to specifying a plurality of information provision start positions. Thus, by using the target point position, the amount of data stored in a header portion can be reduced, and the effect of that reduction becomes larger if the larger number of reproduction start positions need to be set. If the length of the radius is made a fixed value, reproduction start positions can be specified more efficiently, because a data area for specifying the length of the radius does not need to be provided.

Also, as an application, a change amount of a position per a unit of time (a threshold change amount) can be further stored in the header portion. That is, the position match determining unit 255 calculates a change amount of a position (or the position of the vehicle-mounted device 200 at a first time and the position of the vehicle-mounted device 200 at a second time) detected by the position detecting unit for detecting a position of a vehicle-mounted device 254. Furthermore, the position match determining unit 255 determines whether the current position of the vehicle-mounted device 200 is far from the target point position for a distance indicated by the radius and the calculated change amount of a position is equal to or more than (or equal to or less than) a threshold change amount specified in the header portion. If the calculated change amount of a position is equal to or more than (or equal to or less than) the threshold change amount, the data reproducing unit 253 starts reproducing the content data. By doing so, it is possible to control so that content data is reproduced (or not reproduced) based on not only whether the current position of the vehicle-mounted device 200 simply matched with the reproduction start position but also at what speed a vehicle reached the reproduction start position. For example, if a vehicle on which the vehicle-mounted device 200 is mounted approached a position far from a shopping center which is the target point position for a distance of the above described radius (that is, a position at which reproduction should be started under normal circumstances), but unfortunately got stuck in heavy traffic and reached the target point position with "stop-and-go driving", it is possible to provide the vehicle-mounted device 200 content data that shows a "bypass" by taking the heavy traffic into account, or content data of music, video, etc. that makes a driver feel relaxed. Thus, by using a threshold change amount, it is also possible to change content data to the appropriate one according to user's situation.

The display control data includes an information available period starting time and an information available period ending time. The information available period cited herein is, for example, a period for which a limited time discount campaign continues. If these information are recorded and the content data is reproduced only within the period, there will not be a trouble that a driver arrived at the service base of a data delivering side for the discount campaign is disappointed because the campaign is already ended and he or she cannot receive a benefit of the campaign, preventing a detriment such as damaging the image of the data delivering side. The starting time and the ending time of an information available period are represented using a date, a time, a day of the week, or a combination of them. Also, only either one of the information available period starting time or the information available period ending time may be provided. For example, specifications such as "after <month> <date>", "until <month> <date>", etc. are possible.

The display control data includes business days and business hours. The purpose of this is to prevent a trouble that a driver arrives at a service providing spot but the service providing spot is closed because it is outside of business hours, which is similar to the purpose of recording information about the information available period described above. Various formats may be used for representing business days and business hours in as smaller number of bytes as possible. In the present embodiment, a format using bytes from the 41st byte to the 61st byte is adopted. The details of recorded contents in these 21 bytes will be described below with reference to another drawing.

As described above, the $j_{th}$ Contents includes $N_j$ content data. The 62nd byte and later of the display control data are used for recording Push ID numbers of content data included in each content. The header portion ends when the Push ID number of the last ($N_{LAST}$th) content data in the Last Contents is recorded.

First, the number $N_1$ of content data in the First Contents is recorded using one byte, and the Push ID number of the first content data in the First Contents is recorded in the next one byte. The process continues in similar fashion, and recording of the First Contents ends when the Push ID number of the last ($N_1$th) content data in the First Contents is recorded in the $(62+N_1)$th byte.

In a similar fashion, the number $N_2$ of content data in the Second Contents and the Push ID numbers of the first to the $N_2$th content data in the Second Contents, and so on, are sequentially recorded.

A one preferred example of recording business days and business hours in the display control data will now be described with reference to FIG. 9.

Business hours are divided in a unit of one hour. Three bytes from the 41st byte to the 43rd byte are used for representing the business hours on Sunday. This reserves 24 bits, which correspond to 24 hours of a day and are thus favorable. As shown in FIG. 9, each bit is assigned one hour, and "1" and "0" are recorded in a bit corresponding to an hour included in the business hours and a bit corresponding to an hour not included in the business hours, respectively. For example, if the business hours on Sunday of a service providing spot of a data delivering side is from 10:00 am to 5:00 pm, all the bits in the 41st byte become 0; in the 42nd byte, the seventh bit and the sixth bit become 0, and the fifth to zeroth bits become 1; and in the 43rd byte, the seventh bit becomes 1 and the other bits become 0.

Similarly, the 44th to 46th bytes are used for Monday. For example, if Monday is a regular closing day, all the bits in the three bytes become 0. In order to record the business hours of one week, three bytes×seven days=21 bytes are needed. As a result, a total of 21 bytes from the 41st byte to the 61st byte are used for recording business days and business hours.

Each item in the header information, a data size of each item, and a data content of each item described above are just one example, and any modifications of them may also be adopted. It is needless to say that these modifications are also included within the scope of the present invention.

The parallel reproduction determining unit 252 determines whether there is other content data that should be reproduced in parallel with one of the content data acquired by the data acquiring unit 251. Specifically, the parallel reproduction determining unit 252 identifies content data included in each Contents based on the information of Push IDs (the 62nd byte and later in FIG. 8) included in the header information of the acquired display control data. Next, the parallel reproduction determining unit 252 determines whether there is other content data that should be concurrently reproduced based on the information of Push IDs (from the 23rd byte to the $(24+n_{j,k})$th byte in FIG. 7, where $1 \leq j \leq$ Last and $1 \leq k \leq k$MAX) included in the header information of the acquired content data (the content data other than the display control data). As described above, in the header of the content data other than the display control data, the number of concurrently reproduced contents is recorded in the 23rd byte. If the number is zero, it is determined that the content data is reproduced alone, and if the number is 1 or higher, it is determined that other content data that should be concurrently reproduced in parallel with the content data exists. The parallel reproduction determining unit 252 inputs the result of that determination to the data reproducing unit 253. The control unit 207 functions as the parallel reproduction determining unit 252.

The data reproducing unit 253 is prompted by the position match determining unit 255 and the direction match determining unit 257 to start reproducing data, and if the parallel reproduction determining unit 252 determined that there is other content data that should be reproduced in parallel with the content data, the data reproducing unit 203 starts reproducing in parallel the other content data that should be concurrently reproduced with the content data. The control unit 207, the audio processing unit 202 and the output unit 203 work in cooperation to function as the data reproducing unit 253.

Figure 10:
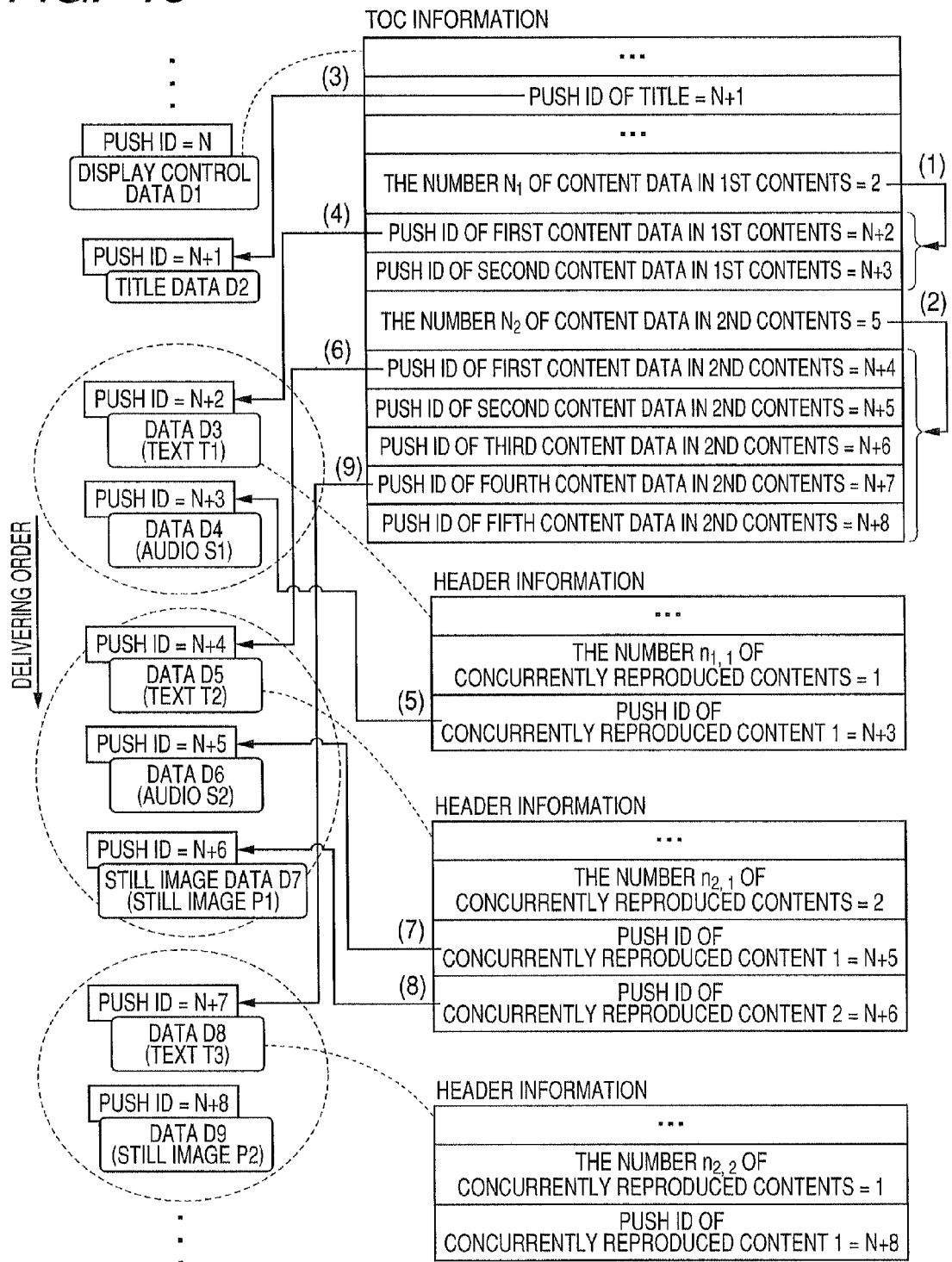
FIG. 10 is a diagram showing an example of a group of data delivered from a data delivering side.

For example, suppose that data delivered from a content delivering side is a group of data shown in FIG. 10. In this example, it is supposed that display control data D1 whose Push ID is N, title data D2 whose Push ID is N+1, data D3 of a text T1 whose Push ID is N+2, data D4 of audio S1 whose Push ID is N+3, data D5 of a text T2 whose Push ID is N+4, data D6 of audio S2 whose Push ID is N+5, data D7 of a still image P1 whose Push ID is N+6, data D8 of a text T3 whose Push ID is N+7, and data D9 of a still image P2 whose Push ID is N+8 were sequentially delivered in this order.

Since it turns out from the header of the display control data D1 (where TOC information is recorded) that the number of content data in the First Contents is two, two bytes of data are referenced, and it turns out that the Push IDs of the first content data and the second content data in the First Contents are N+2 and N+3, respectively (an arrow (1) in FIG. 10). Similarly, it turns out that five content data are included in the Second Contents and they have Push IDs from N+4 to N+8, respectively (an arrow (2) in FIG. 10). Also, in the header of the display control data D1, the Push ID of a title is recorded (an arrow (3) in FIG. 10).

Since it turned out above that the Push ID of the first content data in the First Contents is N+2, the data D3 of the text T1 whose Push ID is N+2 is referenced (an arrow (4) in FIG. 10), and it turns out that the number of concurrently reproduced contents $n_{1,1}$ is one. When the data acquiring unit 251 acquires the data D3 of the text T1, the parallel reproduction determining unit 252 determines that there is other data that should be concurrently reproduced with the data D3 of the text T1 because the number of concurrently reproduced content is one (that is, the number is one or higher) as described above. The data reproducing unit 253 does not start reproducing the acquired data D3 of the text T1 right away, but waits until the other data that should be concurrently reproduced with the data D3 is acquired. Specifically, the data reproducing unit 253 waits until the data D4 of the audio S1, whose Push ID is N+3 which is the Push ID of a concurrently reproduced content 1 specified in the header of the data D3 of the text T1, is acquired (an arrow (5) in FIG. 10). Then, when two of these data are acquired, reproduction of the D3 of the text T1 and the data D4 of the audio S1 corresponding to the Push IDs of N+1 and N+3 are concurrently started, as shown in a dotted circle in FIG. 10.

This enable the data reproducing unit 253 to reproduce content data in accordance with a content delivering side which created the content data so as to be concurrently reproduced. For example, it is possible to display the data D3 of the text T1 as the characters of navigation on a monitor, and at the same time output the audio S1 which is the audio of reading the characters from the speaker 222.

While the First Contents is intended so that all of the content data included therein (two) are concurrently reproduced at once, the Second Contents is divided into two groups. That is, two stages of concurrent reproduction exist in terms of time. This cannot be directly recognized from the header portion of display control data. First, as for the first group, the Push ID of the first content data in the Second Contents (Push ID=N+4) is referenced (an arrow (6) in FIG. 10), and then the header information of the data D5 of the text T2 which is the reference destination is referenced. As a result, it turns out that the data that should be concurrently reproduced with the data D5 of the text T2 whose Push ID is N+4 are the data D6 of the audio S2 whose Push ID is N+5 (an arrow (7) in FIG. 10) and the data D7 of the still image P1 whose Push ID is N+6 (an arrow (8) in FIG. 10), and these three data are thus concurrently reproduced as shown in a dotted circle in FIG. 10.

It turns out that processing of the Second Contents is not finished yet because even though the data reproduced so far are the first to third data in the Second Contents, it is stated, in the Second Contents recorded in the header of display control data as TOC information, that the fourth and later data exist. Since the Push ID of the fourth content data in the Second Contents which is not reproduced yet is recorded as N+7, the header of the data D8 of the text T3 whose Push ID is N+7 is referenced (an arrow (9) in FIG. 10), and it turns out from the header that content data that should be concurrently reproduced with the data D8 is the data D9 of the still image P2 whose Push ID is N+8. These two data are then concurrently reproduced as shown in a dotted circle in FIG. 10.

The data D8 of the text T3 whose Push ID is N+7 and the data D9 of the still image P2 whose Push ID is N+8 are not necessarily reproduced. For example, if contents in accordance with the data D5 to D7, which are concurrently reproduced at a preceding step, prompt a user to perform a selection process and instruct to touch a predetermined area on a touch screen if the user wants to watch and listen to the rest of the contents, a pair of the data D8 and the data D9 are not reproduced unless the user touches the predetermined area.

Figure 11A:
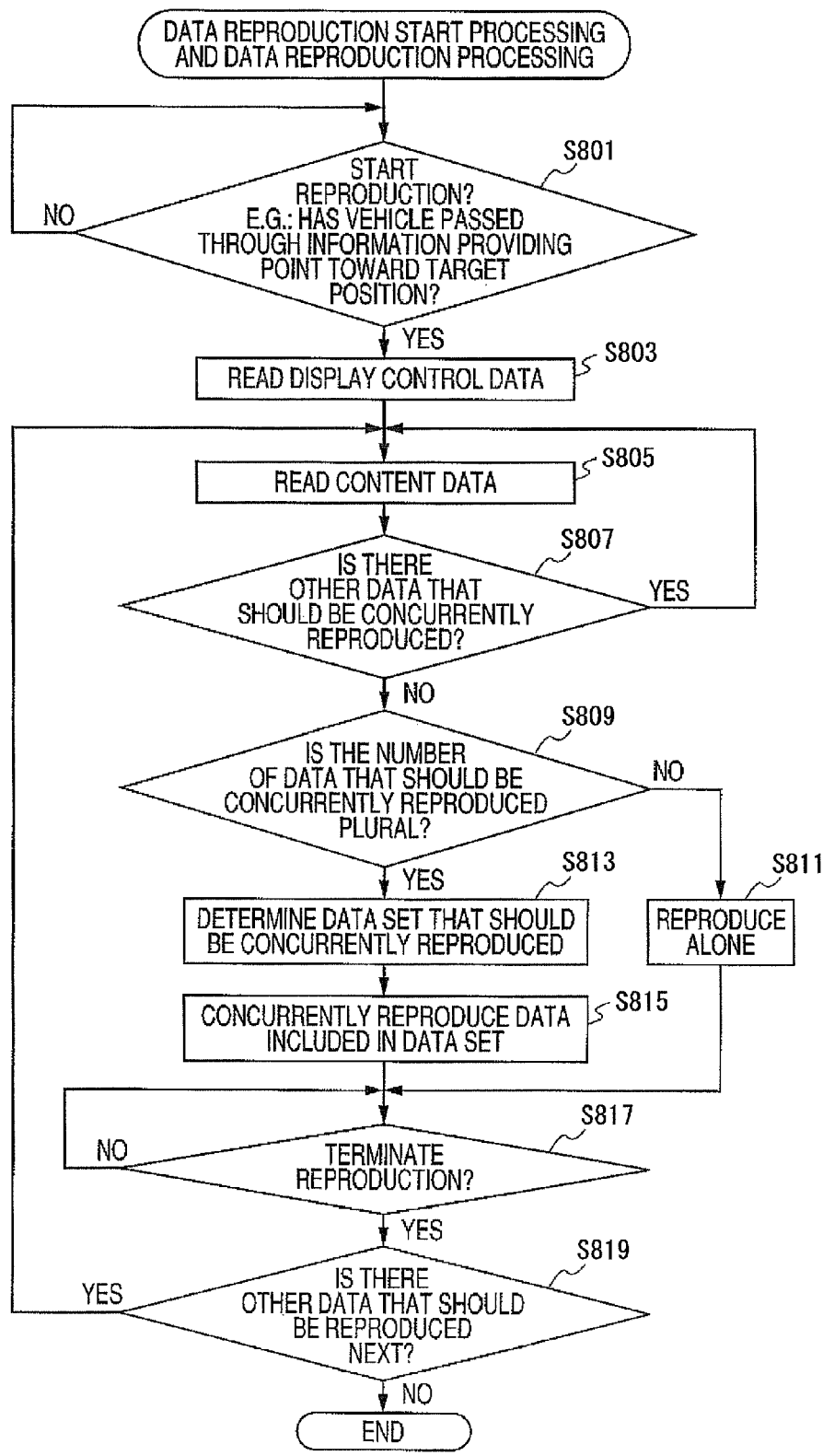
FIG. 11(a) is a flow chart for describing data reproduction processing of a vehicle-mounted device.

Data reproduction start processing and data reproduction processing performed by the data acquiring unit 251, the parallel reproduction determining unit 252, the data reproducing unit 253, the position match determining unit 255 and the direction match determining unit 257 of the present embodiment will now be described with reference to a flow chart in FIG. 11(*a*). In the description below, it is supposed that the vehicle-mounted device 200 has already received push delivery of content data from a roadside device.

The position match determining unit 255 and the direction match determining unit 257 determine whether data reproduction should be started. For example, it is determined whether a vehicle on which the vehicle-mounted device 200 is mounted has passed through an information providing point toward a target point (step S801). This process is continually performed. That is, the step S801 is iterated (No in the step S801) until the result of the determination becomes Yes (Yes in the step S801).

If it is determined by the position match determining unit 255 and the direction match determining unit 257 that content data should be reproduced (Yes in the step S801), the data reproducing unit 253 reads display control data from the storage apparatus 206 (step S803).

Next, content data is acquired (step S805), and it is determined by the parallel reproduction determining unit 252 that whether there is other data that should be concurrently reproduced with the content data (step S807). This determination is performed using information recorded in the header of the content data as a clue, as already described with reference to FIG. 10.

If it is determined that there is other data that should be concurrently reproduced (Yes in the step S807), the processing goes back to the step S805 and the other content data is acquired. That is, the process of the step S805 is iterated until all content data that should be concurrently reproduced are read.

If it is determined that there is not other data that should be concurrently reproduced (or all of the other data have been read) (No in the step S807), it is determined whether the number of data that should be concurrently reproduced is plural (step S809). This determination as well is performed using the information recorded in the header of the content data as a clue, as already described with reference to FIG. 10.

If it is determined that the number of data that should be concurrently reproduced is not plural (that is, the content data should be reproduced alone) (No in the step S809), the data reproducing unit 253 start reproducing the single content data that has been read (step S811).

On the other hand, if it is determined that the number of data that should be concurrently reproduced is plural (Yes in the step S809), a data set that should be concurrently reproduced is determined using the information recorded in the header of the content data as a clue (step S813), and data included in the data set are concurrently reproduced (step S915). This enables the data reproducing unit 253 to reproduce the content data in accordance with a content providing side (data delivering side) which created the content data so as to be concurrently reproduced.

The data reproducing unit 253 determines whether the reproduction should be terminated (step S817). For example, it is determined whether a reproduction time indicated by a DISPLAY TIME recorded in the header has been elapsed, a reproduction time predetermined in the specification of the vehicle-mounted device 200 has been elapsed, reproduction of a specific one of the data that are concurrently reproduced is finished, etc.

If it is determined that the reproduction should not be terminated (No in the step S817), the data reproducing unit 253 continues reproducing the currently reproduced content data. On the other hand, if it is determined that the reproduction should be terminated (Yes in the step S817), it is determined that whether there is other data that should be reproduced next (step S819). In an example in FIG. 10, this means that since there are two data sets that should be concurrently reproduced in the Second Contents, it is determined whether concurrent reproduction of the second data set should be subsequently performed when concurrent reproduction of the first data set is terminated. For example, it is determined whether a user desired to watch and listen to the rest of the Second Contents and conveyed that desire to the control unit 207 through a touch screen and the operating unit 204.

If it is determined that there is data that should be reproduced next (Yes in the step S819), the processing goes back to the step S805. If it is determined that there is no data that should be reproduced next (No in the step S819), the processing is terminated.

Thus, according to the present embodiment, content data can be easily reproduced as intended by a data delivering side.

Figure 11B:
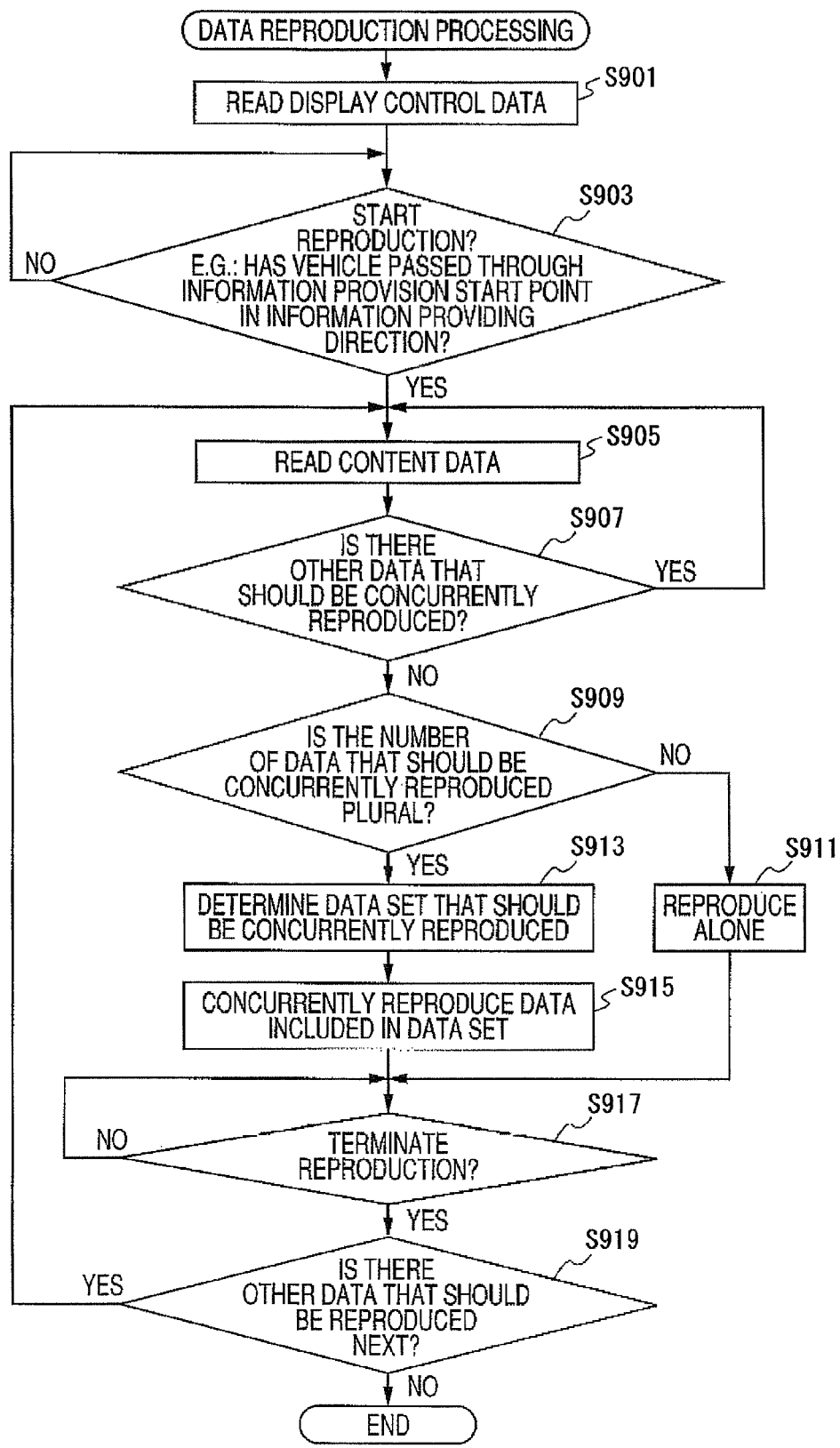
FIG. 11(b) is a flow chart for describing data reproduction processing of a vehicle-mounted device.

Alternative data reproduction start processing and data reproduction processing performed by the data acquiring unit 251, the parallel reproduction determining unit 252, the data reproducing unit 253, the position match determining unit 255 and the direction match determining unit 257 of the present embodiment will now be described with reference to a flow chart in FIG. 11(b). In the description below, it is supposed that the vehicle-mounted device 200 has already received push delivery of content data from a roadside device.

The position match determining unit 255 and the direction match determining unit 257 reads display control data (step S901), and determines whether data reproduction should be started (step S903). For example, it is determined whether a vehicle on which the vehicle-mounted device 200 is mounted has passed through an information provision start position toward a target point position. This process is continually performed. That is, the step S903 is iterated (No in the step S903) until the result of the determination becomes Yes (Yes in the step S903).

Next, the content data is acquired (step S905), and it is determined by the parallel reproduction determining unit 252 that whether there is other data that should be concurrently reproduced with the content data (step S907). This determination is performed using information recorded in the header of the content data as a clue, as already described with reference to FIG. 10.

If it is determined that there is other data that should be concurrently reproduced (Yes in the step S907), the processing goes back to the step S905 and the other content data is acquired. That is, the process of the step S905 is iterated until all content data that should be concurrently reproduced are read.

If it is determined that there is not other data that should be concurrently reproduced (or all of the other data have been read) (No in the step S907), it is determined whether the number of data that should be concurrently reproduced is plural (step S909). This determination as well is performed using the information recorded in the header of the content data as a clue, as already described with reference to FIG. 10.

If it is determined that the number of data that should be concurrently reproduced is not plural (that is, the content data should be reproduced alone) (No in the step S909), the data reproducing unit 253 start reproducing the single content data that has been read (step S911).

On the other hand, if it is determined that the number of data that should be concurrently reproduced is plural (Yes in the step S909), a data set that should be concurrently reproduced is determined using the information recorded in the header of the content data as a clue (step S913), and data included in the data set are concurrently reproduced (step S915). This enables the data reproducing unit 253 to reproduce the content data in accordance with a content providing side (data delivering side) which created the content data so as to be concurrently reproduced.

The data reproducing unit 253 determines whether the reproduction should be terminated (step. S917). For example, it is determined whether a reproduction time indicated by a DISPLAY TIME recorded in the header has been elapsed, a reproduction time predetermined in the specification of the vehicle-mounted device 200 has been elapsed, reproduction of a specific one of the data that are concurrently reproduced is finished, etc.

If it is determined that the reproduction should not be terminated (No in the step S917), the data reproducing unit 253 continues reproducing the currently reproduced content data. On the other hand, if it is determined that the reproduction should be terminated (Yes in the step S917), it is determined that whether there is other data that should be reproduced next (step S919). In an example in FIG. 10, this means that since there are two data sets that should be concurrently reproduced in the Second Contents, it is determined whether concurrent reproduction of the second data set should be subsequently performed when concurrent reproduction of the first data set is terminated. For example, it is determined whether a user desired to watch and listen to the rest of the Second Contents and conveyed that desire to the control unit 207 through a touch screen and the operating unit 204.

If it is determined that there is data that should be reproduced next (Yes in the step S919), the processing goes back to the step S905. If it is determined that there is no data that should be reproduced next (No in the step S919), the processing is terminated.

Thus, according to the present embodiment, content data can be easily reproduced as intended by a data delivering side. In this flow chart, even though the position match determining unit 255 and the direction match determining unit 257 set a condition for starting reproduction in the step S903 as "a vehicle on which the vehicle-mounted device 200 is mounted passes through an information provision start position in an information providing direction", other condition may be defined.

In summary, as this condition, many variations using display control data can be adopted, such as follows.

(1) A variation that uses an information provision start position. That is, a reproduction start condition is that "the current position of a vehicle on which the vehicle-mounted device 200 is mounted matches (or does not match) with an information provision start position". For example, the condition would be that "a vehicle on which the vehicle-mounted device 200 is mounted passes through the XX intersection".

(2) A variation that uses an information provision start distance. That is, a reproduction start condition is that "a vehicle on which the vehicle-mounted device 200 is mounted has traveled (or not traveled) for an information provision start distance after receiving content data" or "a vehicle on which the vehicle-mounted device 200 is mounted has traveled for less than an information provision start distance from a position at which content data is received". For example, the condition would be that "a vehicle on which the vehicle-mounted device 200 is mounted has traveled for X meters after passing through the XX intersection", "a vehicle on which the vehicle-mounted device 200 is mounted has traveled for less than X meters from XX intersection", etc. Any unit can be used for a distance.

(3) A variation that uses an information providing direction. That is, a reproduction start condition is that "the moving direction of a vehicle on which the vehicle-mounted device 200 is mounted matches (or does not match) with an information providing direction". For example, the condition would be that "a vehicle on which the vehicle-mounted device 200 is mounted is moving toward the XX department store", "a vehicle on which the vehicle-mounted device 200 is mounted is moving in a direction opposite to city center", etc. Even though the direction may be a precise orientation or an approximate direction such as north, south, east and west, the present embodiment uses 16 orientations, which is similar to the general specification of VICS. It may be determined that the moving direction of a vehicle on which the vehicle-mounted device 200 is mounted matches with an information providing direction if the moving direction of the vehicle is included in a direction within a predetermined angle range centered on the information providing direction.

(4) A variation that uses a road type. That is, a reproduction condition is that "a road on which a vehicle on which the vehicle-mounted device 200 is mounted is traveling is (or is not) the road specified by a road type". For example, the condition would be that "a vehicle on which the vehicle-mounted device 200 is mounted is traveling on a general road", "a vehicle on which the vehicle-mounted device 200 is mounted is traveling on an expressway", etc.

(5) A variation that uses a target point position. That is, a reproduction start condition is that "the current position of a vehicle on which the vehicle-mounted device 200 is mounted is (or is not) far from a target point position for a predetermined distance" or "the position of a vehicle on which the vehicle-mounted device 200 is mounted is getting closer to (away from) a target point position for a predetermined distance per a predetermined unit of time". For example, the condition would be that "a vehicle on which the vehicle-mounted device 200 is mounted is far from the XX department store for more than X meters", "a vehicle on which the vehicle-mounted device 200 is mounted is getting closer to the XX service area at more than X kilometers per hour", etc.

(6) A variation that uses an information available period starting time and/or an information available period ending time. That is, a reproduction start condition is that "the current date and time is (or is not) within an information available period". For example, the condition is that "today is <month> <date>, <year> on which the XX department store newly opens", "today is the first day of three consecutive holidays", "now is the midnight discount period (from <hour>: <minute> to <hour>:<minute>)", etc.

(7) A variation that uses business days and/or business hours. That is, a reproduction start condition is that "the current date and time is (or is not) in business days and/or business hours". For example, the condition would be that "today is the nonbusiness day of the XX department store", "it is two minutes before the opening time of the XX department store", etc. Date may be used instead of a day of the week.

Any of these may be adopted as a reproduction start condition, or a reproduction start condition may be created by arbitrarily combining them.

A specific example of content data reproduction performed by the vehicle-mounted device 200 of the present embodiment will now be described with reference to the FIG. 12.

In order to facilitate understanding, sample data to be push-delivered is adopted from the one illustrated in FIG. 10, as shown in FIG. 12(a). The first two data are display control data for providing TOC information and title data for being utilized in, for example, organizing contents of the storage apparatus 206, and these data are basically not displayed on a monitor or output from the speaker 222 of the vehicle-mounted device 200 as a car navigation vehicle-mounted apparatus.

FIGS. 12(b) to 12(d) are schematic diagrams of a monitor and the speaker 222. A monitor 124 displays, for example, a road map of the vicinity of the current position of a driver (roads, intersections, a traffic signal, a post office and a house are illustrated), a guide for a driver to reach a destination (a bended arrow meaning "turn left at 140 m ahead" is illustrated), and the position of a driver (the current position and the moving direction are illustrated by a circle and a triangle depicted therein). The star indicates an information provision start position (the 34th byte in FIG. 8) set by a data delivering side which push-delivered the content data shown in FIG. 12(a) under a predetermined intension, and does not need to be actually displayed on the monitor 124.

FIGS. 12(b) to 12(d) are arranged in chronological order. A vehicle approaches the information provision start position (FIG. 12(b)), passes the position (FIG. 12(c)), and gets closer to the intersection (FIG. 12(d)).

When the vehicle approaches an information provision start position recorded in the header of display control data, the data reproducing unit 253 is prompted by the position match determining unit 255 to reproduce data. In accordance with the steps already described with reference to FIGS. 10 and 11, the vehicle-mounted device 200 concurrently reproduces the data of the text T1 whose Push ID is N+2 and the data of the audio S1 whose Push ID is N+3. That is, as schematically shown in FIG. 12(b), the text T1 is displayed as a popup on the monitor, and at the same time the audio S1 is output from the speaker 222.

Next, reproduction of each content in the Second Contents is started. The data of the text T2 whose Push ID is N+4, the data of the audio S2 whose Push ID is N+5, and the data of the still image P1 whose Push ID is N+6 are concurrently reproduced by the vehicle-mounted device 200. That is, as shown in FIG. 12(c), the text T2 and the still image P1 are displayed as popups on the monitor while the audio S2 is output from the speaker 222.

Although the rest of content data in the Second Contents is not necessarily reproduced depending on user's selection or the like as described above, if it is reproduced, the data of the text T3 whose Push ID is N+7 and the data of the still image P2 whose Push ID is N+8 are concurrently reproduced by the vehicle-mounted device 200. That is, as shown in FIG. 12(d), the text T3 and the still image P2 are concurrently displayed on the monitor as popups.

Figure 13:
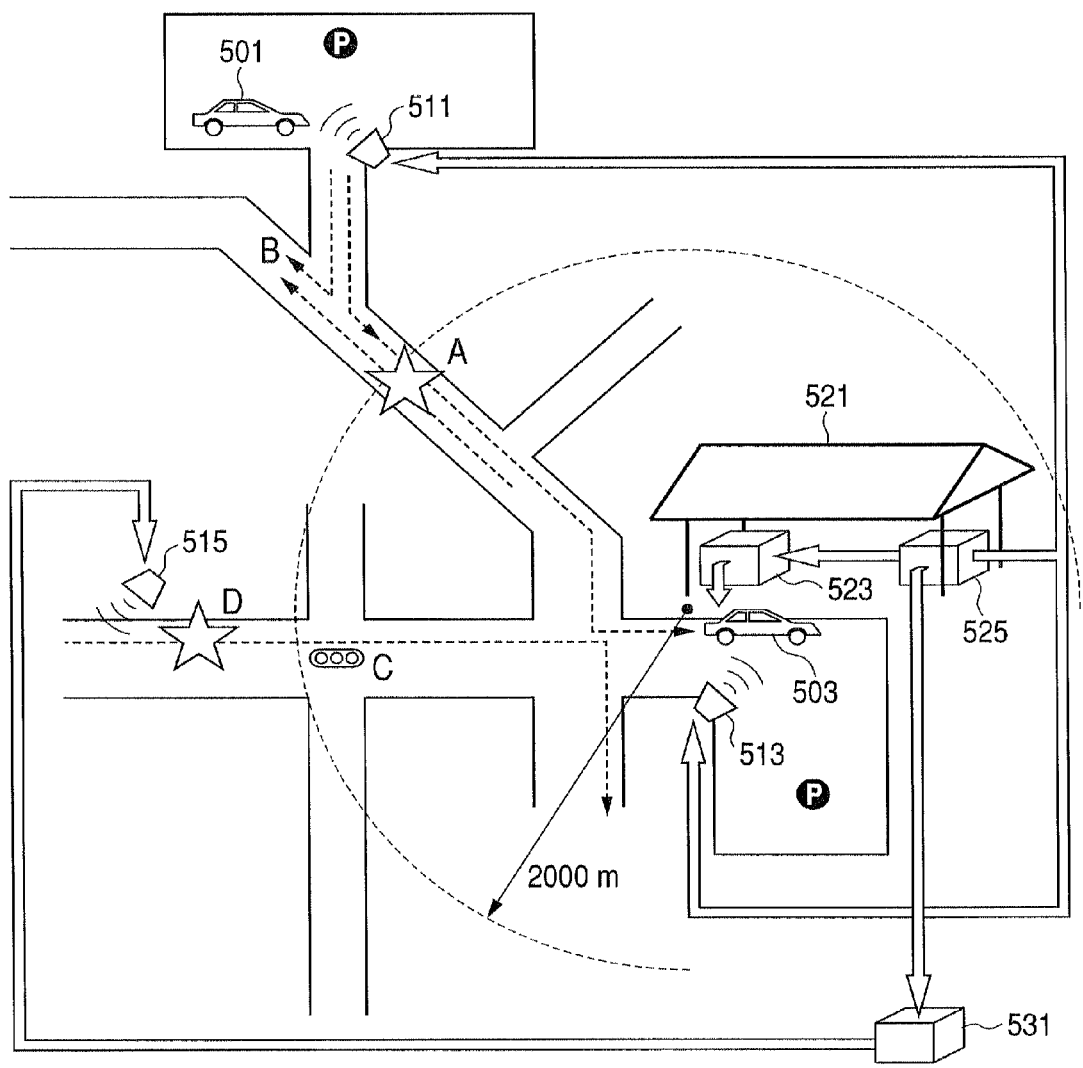

FIG. 13 is a schematic diagram showing the relationship between the reproduction behavior of the vehicle-mounted device 200 of the present embodiment and push delivery performed by a data providing side as well as service provisioning at a service providing spot which is the base of the data providing side.

Suppose that a driver pulled a vehicle 501 for taking a rest into parking spaces (shown by an outline character P on a colored background) in which a roadside device 511 is placed. When that happened, push delivery is performed by radio wave transmission from the roadside device 511 to the vehicle-mounted device 200 which is a car navigation vehicle-mounted apparatus mounted on the vehicle 501. The content to be push-delivered is typically an advertising content created by the data delivering side with the intension to lead the driver of the vehicle 501 to a service providing spot 521 which is the base of the data providing side and make the driver receive a service provided by a service providing apparatus 523 of the service providing spot.

When the driver of the vehicle 501 pulled out of the parking spaces, the content data push-delivered is not reproduced immediately. For the data delivering side, it is desirable that the advertising content is watched and listened to at a timing at which the driver can most easily be led. Thus, a point A represented by a star sign between the parking spaces in which the roadside device 511 is placed and the service providing spot 521 is recorded as an information provision start position in the header of display control data. If the vehicle 501 happens to turn left after pulling out of the parking spaces, it reaches the point A sooner or later. The vehicle-mounted device 200 of the present embodiment starts reproducing the content data at a timing when the vehicle 501 reached the point A. This makes the driver recognize that the service providing spot 521 exists in the direction that the driver is traveling, and gives a momentum to stop at the service providing spot even if the driver is driving for other purposes, which significantly increases the effectiveness of the advertisement. In other words, it can be said that the data is reproduced as intended by the data delivering side.

As described above with reference to FIG. 8, a data delivering side may inform the vehicle-mounted device 200 of a preferred timing for reproducing data by indicating an information provision start distance instead of an information provision start position. In the example of FIG. 13, the distance between the parking spaces in which the roadside device 511 is placed and the point A may be measured in advance, and that distance may be set as the information provision start distance. Although this is easier than defining an information provision start position by using coordinates or the like, if the vehicle 501 happens to turn right after pulling out of the parking spaces, data reproduction starts at an opposite point B which is the same distance away from the parking spaces as the point A. Even if data reproduction is started at the point B and the driver recognizes the existence of the service providing spot 521, the driver has to turn the vehicle around to go to the service providing spot, and it is thus more difficult to lead the driver to the service providing spot compared to the case where data reproduction is started at the point A. That is, the effectiveness of the advertisement is lower.

Suppose that as a result of being led by an advertising content data, the driver entered the parking spaces of the service providing spot 521 of the data delivering side which is the advertiser of the advertising content data (the position of the vehicle is schematically indicated by a vehicle 503). The driver there receives a service provided by the service providing apparatus 523 and brings benefits to the service providing side by, for example, paying for the service. The parking spaces of the service providing spot 521 also has a roadside device 513 placed therein, and when a radio signal transmitted from the roadside device 513 and controlled by the data delivering side is received by the vehicle-mounted device 200 mounted on the vehicle 503, a predetermined flag is set in a predetermined area within the storage apparatus 206 of the vehicle-mounted device 200. This flag is for indicating that the vehicle 503 has already stopped at the service providing spot 521 and it is thus no longer needed to reproduce the content data. By adding functionality for managing the flag to the vehicle-mounted device 200, it is possible to avoid repeatedly reproducing the content data when a vehicle on which the vehicle-mounted device 200 having the predetermined flag set is mounted reached the point A again after leaving the service providing spot 521. This mechanism is in line with the inclination of a data delivering side, because if the content data is repeatedly reproduced, a driver may have a displeasing impression of "persisting" and never stop at the service providing spot again.

Since a data reproducing apparatus comprises the direction match determining unit 257, data is not reproduced when the vehicle 501 came to the vicinity of the service providing spot 521 by way of a road on which an information provision start position is not set and then traveled on the road on which the point A of the figure is set in a direction from the point A to the point B (that is, traveled in a direction opposite to the service providing spot 521). If reproduction is performed, a driver will feel compelled to do a U-turn and have an unpleasing impression about the service providing spot 521, which is disadvantageous to a data delivering side. The direction match determining unit enables to reproduce data as intended by a data delivering side in that the unit prevents this sort of problem.

Specifications of the service providing apparatus 523 (the types of services that can be provided, a benefit of receiving discount only in a specific period of time, and business days and hours) are examined as needed by a commercial data creating apparatus 525 which is under control of a data delivering side. The commercial data creating apparatus 525 creates content data (both data of display control content data and other content data) based on the result of the examination to transmit to the roadside device 511 so that optimized and up-to-date information is to be push-delivered. The commercial data creating apparatus 525 also transmits necessary data, such as the above described flag, to the roadside device 513 placed in the parking spaces of the service providing spot 521.

The information provision start position is not necessarily limited to one position of the point A. As describe above, it is more advantageous to set a lot of information provision start positions so as to surround the service providing spot 521, because it enable to lead a driver to the service providing spot from every direction.

If it is cumbersome to specify a lot of information provision start positions one at a time, a circle whose center is a service providing spot and which has a predetermined radius (2,000 m in the example of FIG. 13) may be drawn, and intersecting points of the circumference of the circle and roads may be regarded as information provision start positions. As already described with reference to FIG. 8, the distance may be recorded subsequent to a target point position (the position of the service providing spot 521), for example, in the header of display control data.

However, in this method, if the intersecting points happen to be in the vicinity of an intersection (a point C in FIG. 13), there may be a disadvantage for a data delivering side. In the vicinity of an intersection, it is highly likely that an uncommercial data content that the vehicle-mounted device 200 as a car navigation vehicle-mounted apparatus should reproduce at a top priority is reproduced. For example, when precautions about traffic safety at the intersection C created by an uncommercial data creating apparatus 531 is push-delivered to the vehicle-mounted device 200 by the roadside device 515, and a vehicle reaches the intersection, the data of the precautions is preferentially reproduced, leaving an advertising content of the service providing spot 521 unreproduced.

Thus, the commercial data creating apparatus 525 examines the specifications of the uncommercial data creating apparatus 531, and creates commercial data based also on the result of the examination. Specifically, for example, when it is determined that the uncommercial data creating apparatus 531 is to create uncommercial data whose information provision start point is in the proximity of the point C where an intersection is located, the commercial data creating apparatus 525 may create commercial data whose information provision start position is a point D which is far from the point C. The specifications of the uncommercial data creating apparatus 531 are expected to be disclosed to the public in view of the public benefit of the apparatus. Thus, it is considered that the commercial data creating apparatus 525 can easily examine the specifications of the uncommercial data creating apparatus 531.

Although the service providing apparatus 523, the commercial data creating apparatus 525 and the uncommercial data creating apparatus 531 are described above as predetermined apparatuses for automatically performing predetermined operations, they may be operations performed by a human.

[Embodiment 2]

Another embodiment of the present invention will now be described. Although in the above described embodiment a geographical position at which reproduction of content data is started is a spot (point) represented by using longitude and latitude, this embodiment is different from the above described embodiment in that it uses, instead of a point, a geographical area (region) including the point. The details will be described below.

Figure 14:
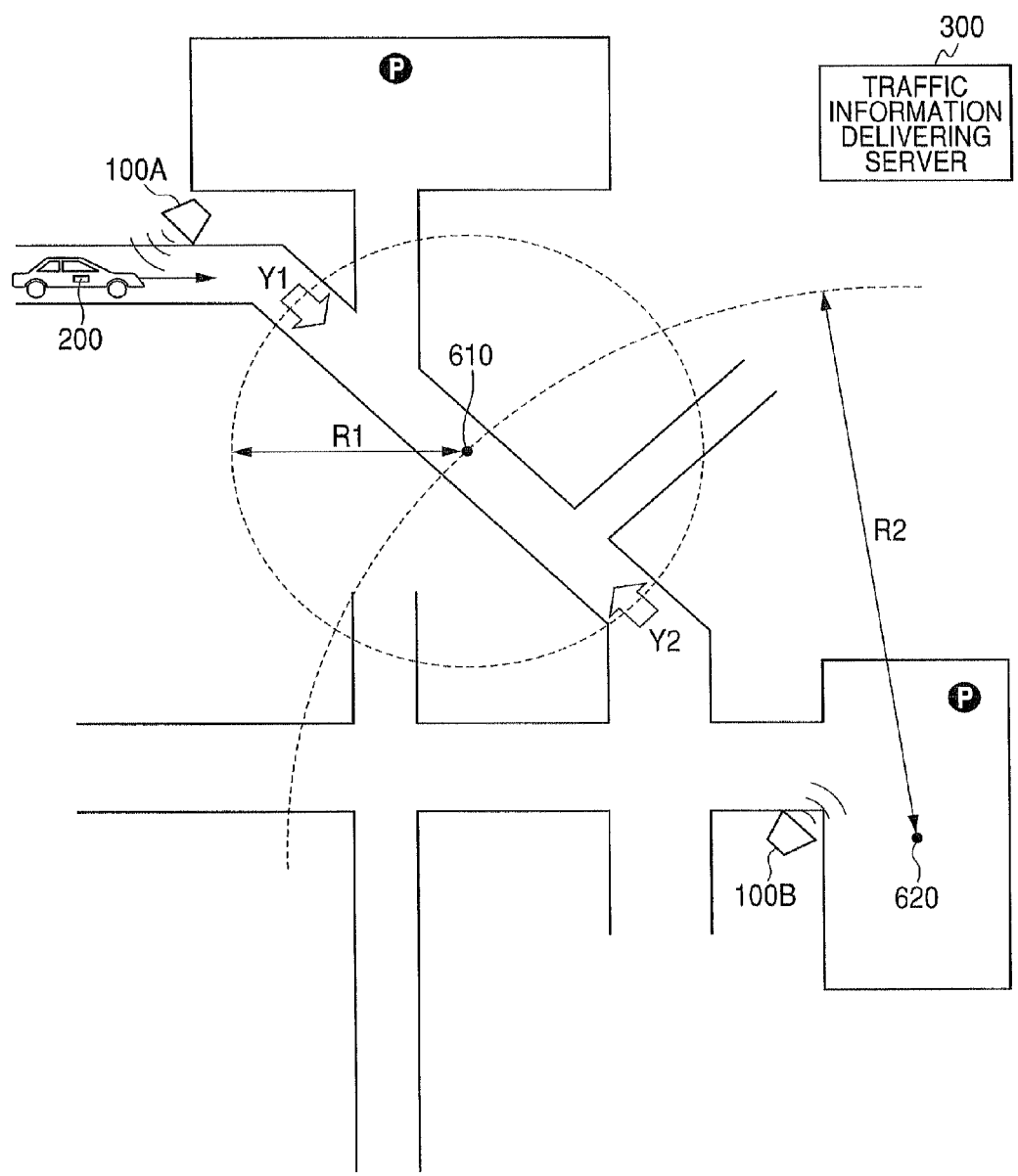
FIG. 14 is a diagram for describing a condition required for reproduction in Embodiment 2.

As shown in FIG. 14, this geographical area is typically an area within a circle whose center is an information provision start position 610 and whose radius is a predetermined distance R1. This circular area will hereinafter be called an information provision start area. Although a point which is the center of the circle may be specified at the information provision start position 610, the point may also be specified on the circumference of a circle whose center is a target point position 620 and whose radius is a R2. The length of the predetermined radius R1 is provided to the vehicle-mounted device 200 in association with the information provision start position 610. That is, in display control data, data that specifies the length of the radius R1 in addition to the information provision start position 610 is stored.

In the present embodiment, the data reproducing unit 253 starts reproducing the specified content data if both of the following conditions are met.

(a) The vehicle-mounted device 200 (a vehicle on which the vehicle-mounted device 200 is mounted) is in an information provision start area (in a circular area whose radius is R1).

(b) The vehicle-mounted device 200 (a vehicle on which the vehicle-mounted device 200 is mounted) is moving in an information providing direction Y1. That is, a reproduction condition is "(a) and (b)". For example, the reproduction condition is met when the vehicle proceeded into the information provision start area in a direction indicated by an arrow Y1 in the present figure, but the reproduction condition is not met when the vehicle proceeded into the information provision start area in a direction indicated by an arrow Y2 which is different from (in this example, opposite of) the direction indicated by the arrow Y1.

That is, when the position match determining unit 255 determines that the vehicle-mounted device 200 (a vehicle on which the vehicle-mounted device 200 is mounted) is in an information provision start area, and the direction match determining unit 257 determines that the vehicle-mounted device 200 (a vehicle on which the vehicle-mounted device 200 is mounted) is moving in the direction indicated by the arrow Y1, the data reproducing unit 253 start reproducing content data acquired.

Of the above described reproduction condition, the length of the radius R1 that defines the information provision start area of (a) may be either a fixed value or a variable value depending on purposes. Typically, the length is about the width of a road on which a vehicle on which the vehicle-mounted device 200 is mounted is currently traveling. For example, if it is enough to perform reproduction along one general road, the length may be set to about 10 meters. If it is desired to perform reproduction also along a road next to the road on which the vehicle is traveling, or in other neighboring areas (such as parking spaces and facilities facing the road on which the vehicle is traveling), the length may be set to as wide as several tenth to several hundreds of meters. Also, if a road on which the vehicle travels is a road having many lanes such as a highway, the length may also be set to about the width of lanes of one way, so that content data to be reproduced can be changed between an upbound direction and a downbound direction, for example. The data acquiring unit 251 can acquire the length of this width by reading the map information of the vicinity of the road on which the vehicle is currently traveling from the storage apparatus 206.

Also, if the value of the radius R1 is made variable, it is possible to allow a user to change the value depending on the intended use or preferences. In order to cope with the aging society expected in future, there could be an increasing number of occasions in which content data created so as to slowly produce a sound including a navigation sound is reproduced. Thus, the vehicle-mounted device 200 may be adapted so that the operating unit 204 receives an instruction input indicating the length of the radius R1 from a user, and the position match determining unit 255 and the direction match determining unit 257 changes the length of the radius R1 based on the received instruction input and determines whether a reproduction condition is met in accordance with a position, a direction, etc. as described above. The length of the radius R1 once set is stored in the storage apparatus 206, and passed to and used in subsequent determination of the reproduction condition. The operating unit 204 may receive the length of the radius R1 directly from a user, or allow a user to specify the length by freely selecting from predetermined alternatives corresponding to general levels of small, medium and large (the number of levels and the lengths of those levels are arbitrary).

It is desirable that content data for which the radius R1 is made variable is the one that does not give a false impression to a user even when a location at which reproduction is started is changed. Thus, a flag indicating whether the radius R1 can be changed (ON/OFF) may be further stored in display control data, so that the data acquiring unit 251 can allow changing the setting of the radius R1 for the content data corresponding to the display control data in which the flag is set to ON, and disallow changing of the setting of the radius R1 for the content data corresponding to the display control data in which the flag is set to OFF.

The flow chart of the processing performed by each unit of the present embodiment is the same as the above described flow chart except the reproduction condition in the step S801, which should be replaced with "(a) and (b)", and thus will not be described in detail.

For example, suppose that the content data delivered from a roadside device 100A in FIG. 14 is the data for an approach route (such as "there are empty spaces in the parking lot"), and the content data delivered from a roadside device 100B is the data for a return route (such as "thank you for using us"). The data acquiring unit 251 receives the data for an approach route from the roadside device 100A, and when a vehicle on which the vehicle-mounted device 200 is mounted proceeded into an information provision starting area in a direction represented by an arrow Y1, the data reproducing unit 253 reproduces the data for an approach route. However, when the vehicle proceeded into the information provision starting area in a direction represented by an arrow Y2, the data for an approach route is not reproduced. Instead, the data reproducing unit 253 reproduces the data for a return route acquired from the roadside device 100B when the vehicle proceeded into the information provision starting area in the direction represented by the arrow Y2. The data for a return route is not reproduced when the vehicle proceeded into the information provision starting area in the direction represented by the arrow Y1.

In this example, the roadside devices 100A and 100B may be adapted to deliver both of the data for an approach route and the data for a return route. This makes management of content data easier, because a content providing side doesn't need to consider which content data is to be delivered from which roadside device.

Thus, according to the present embodiment, content data to be reproduced may be easily changed based on into which area a vehicle on which the vehicle-mounted device 200 is mounted proceeded in which direction. The reproduction condition described therein is used as "a condition for starting reproduction", but it is also possible to adopt an embodiment in which the condition is replaced with "a condition for reproducing".

[Embodiment 3]

Another embodiment of the present invention will now be described. The present embodiment is the one that further adds a condition using a road type to the reproduction condition adopted in Embodiment 2. The details will be described below.

Figure 15:
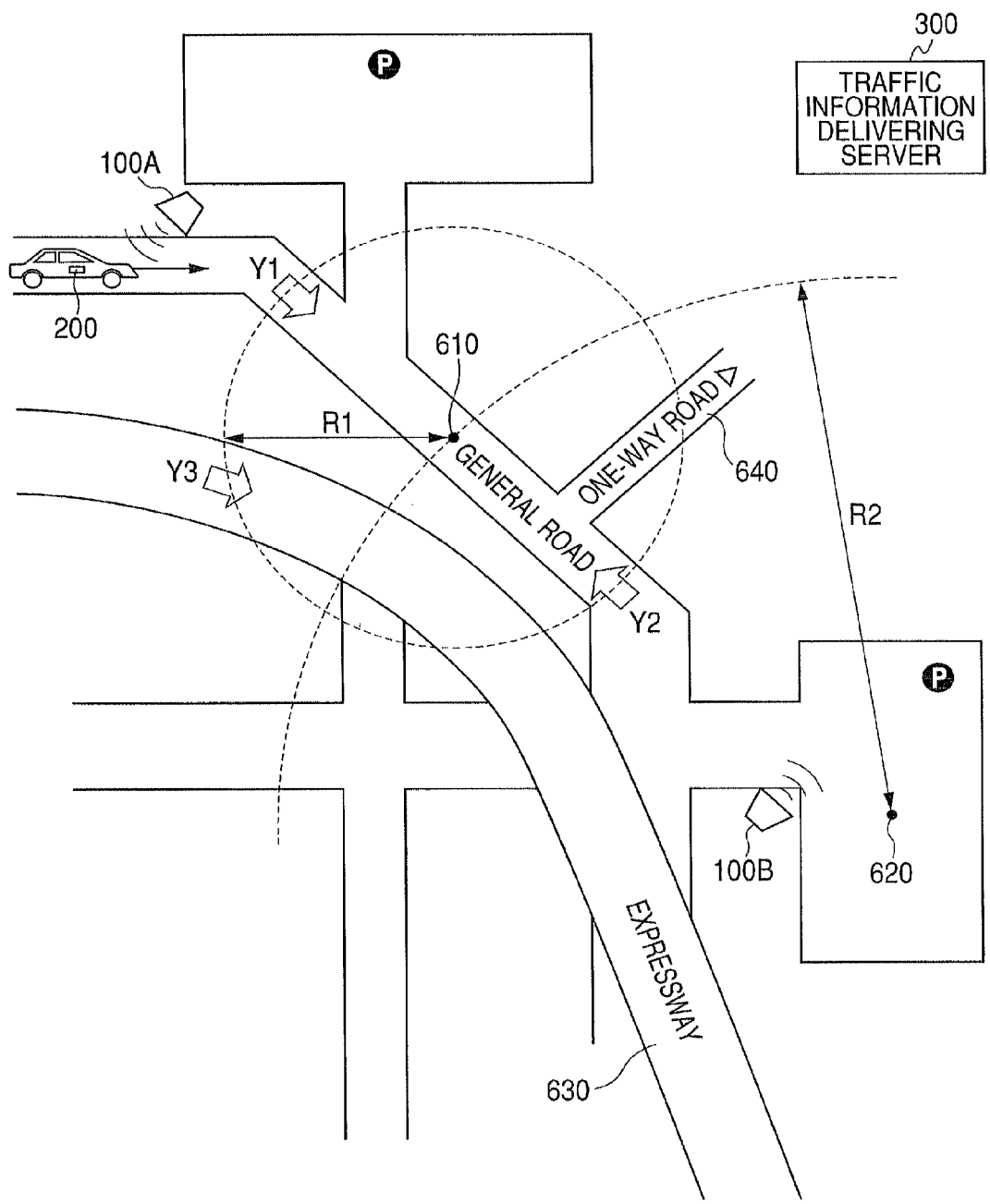
FIG. 15 is a diagram for describing a condition required for reproduction in Embodiment 3.

As shown in FIG. 15, as with the above described embodiment, an area within a circle whose center is the information provision start position 610 and whose radius is the predetermined distance R1 is the area in which reproduction of content data is started. When a vehicle on which the vehicle-mounted device 200 is mounted proceeds into this area in the information providing direction Y1, reproduction of content data received from the roadside device 100 is started.

In the present example, a road on which the vehicle-mounted device 200 moves is a general road (except a one-way road), and there is an expressway 630 located close thereto and stretching substantially in parallel therewith. If the reproduction condition is "(a) and (b)" as with the above described embodiment, reproduction of content data is started even when the vehicle-mounted device 200 proceeded into this circular area in a direction indicated by an arrow Y3 which is the substantially same direction as the information providing direction Y1. However, if content data such as promotions and advertisements are reproduced while running on the expressway 630, it could affect driving performance. Also, in a situation where it is not possible to exit from the expressway 630 to a general road, as shown in the present figure, there would be little merit for a service providing side even if the promotions, advertisements, etc. of a service providing spot located at the target point position 620 are provided to the vehicle-mounted device 200 mounted on a vehicle running on the expressway 630.

Thus, in the present embodiment, the following condition (c) is further added to the reproduction condition.

(c) The vehicle-mounted device 200 (a vehicle on which the vehicle-mounted device 200 is mounted) is moving on a road specified by a road type.

That is, the reproduction condition is "(a) and (b) and (c)". A road type is the information stored in the above described display control data. In the present example, there are only three road types: an expressway, a general road and a one-way road. However, it is needless to say that types in accordance with other classification methods may also be used.

If the position match determining unit 255 determines that the vehicle-mounted device 200 (that is, a vehicle on which the vehicle-mounted device 200 is mounted) is in an information provision start area, and the direction match determining unit 257 determines that the vehicle-mounted device 200 is moving in a direction indicated by the arrow Y1, and the position match determining unit 255 determines that the vehicle-mounted device 200 is moving on a road specified by a road type, the data reproducing unit 253 starts reproducing the content data acquired. The position match determining unit 255 reads map information stored in the storage apparatus 206 to acquire the road type of a road on which the vehicle-mounted device 200 is currently moving, and determines whether the acquired road type matches with the road type specified.

For example, if a condition "(c') a road type is not an expressway" is adopted as one condition included in the reproduction condition, content data is reproduced when the vehicle-mounted device 200 proceeded into an information provision start area in the information providing direction Y1 and the vehicle on which the vehicle-mounted device 200 is mounted is traveling on a road other than an expressway (such as a two-way general road and a one-way road).

For example, if a condition "(c") a road type is a general road" is adopted as one condition included in the reproduction condition, reproduction may also be stopped when the vehicle-mounted device 200 entered a road 640, which is a one-way road, after proceeding into an information provision start area in the information providing direction Y1.

Also, of the road types, a general road may be further segmented so that a reproduction condition can be defined based on a road having a grade separation and a road not having a grade separation. A grade separation includes an overpass and an underpass. For example, even though being categorized into a general road, some major highways have a structure in which straight through lanes have a grade separation for eliminating an intersection while other lanes have an intersection so that vehicles can turn right or left. These traffic points may also included in map information in advance, and the position match determining unit 255 may determine whether a reproduction condition is met based on whether there is a grade separation. If it is not possible to go to the direction of a place where a service providing spot exists, providing a user a navigation guide or the like for heading for the service providing spot is wasteful. Thus, even when the vehicle-mounted device 200 proceeded into an information provision start area in an information providing direction, if it is not possible to go to the direction of a service providing spot because the road on which the vehicle-mounted device 200 is moving has a grade separation and making a turn is not possible, content data about the information providing spot may not be reproduced.

That is, the position match determining unit 255 determines, based on a target point position and a road type stored in display control data, whether a vehicle on which the vehicle-mounted device 200 is mounted can reach the target point position if it continue going along the road on which it is currently traveling. If it is determined that the vehicle cannot reach the target point position, the data reproducing unit 253 does not reproduce the content data corresponding to the display control data. If it is determined that the vehicle can reach the target point position, the content data may be reproduced.

This means that, in addition to two-dimensional positional relationships in accordance with latitude and longitude, three-dimensional positional relationships including height can be substantially considered in a reproduction condition. As a specific example, suppose that a store S (a service providing spot) is located along a road R1 running on flatlands, and an elevated road R2 is running above and in parallel with the road R1. The road R1 has many right- or left-turn points, but on the elevated road R2 it is only possible to go straight and cannot turn right or left. If a vehicle on which the vehicle-mounted device 200 is mounted is traveling on the road R1, there are possibly a number of routes to reasonably go to the store. However, if the vehicle is running on the road R2, it could be said that there is generally no routes to reasonably go to the store. Thus, if only two-dimensional positional relationships are considered, content data is reproduced as long as the vehicle is proceeding into a specified information provision start area in a specified direction, no matter whether the vehicle is running on the road R1 or the road R2. Therefore, by using road types that take into account a grade separation, it is possible to control so that content data of the advertisement of the shop S is reproduced when the vehicle is traveling on the road R1 and not reproduced when the vehicle is traveling on the road R2.

Thus, according to the present embodiment, content data to be reproduced may be easily changed based on which road a vehicle on which the vehicle-mounted device 200 is mounted is running.

[Embodiment 4]

Another embodiment of the present invention will now be described. The vehicle-mounted device 200 is typically provided as an apparatus integrated with a car navigation apparatus, but there could be a timing at which reproduction of content data should be started because the reproduction condition of that content data happens to be met while the vehicle-mounted device 200 is reproducing navigation guide. Thus, as a result of continually prioritizing reproduction of navigation guide, content data delivered could never be reproduced, causing a disadvantage for a content providing side. It is an object of the present embodiment to address this problem.

If reproduction of content data could not be started (or content data could not be reproduced) within an information provision start area, a flag indicating whether the content data should be reproduced after navigation is finished (hereinafter referred to as a "delayed reproduction flag") is further stored in display control data. The data reproducing unit 253 determines whether the content data should be belatedly reproduced based on this delayed reproduction flag. Typically, if the value set to the delayed reproduction flag is "1", content data is reproduced even when it is belated, and if the value is "0", content data is not reproduced.

In addition to the above described (a) and (b), the following condition (d) is added to the reproduction condition of the present embodiment. That is, the reproduction condition is "(a) and (b) and (d)".

(d) A delayed reproduction flag is "1", and the vehicle-mounted device 200 is not reproducing other content data.

Figure 16:
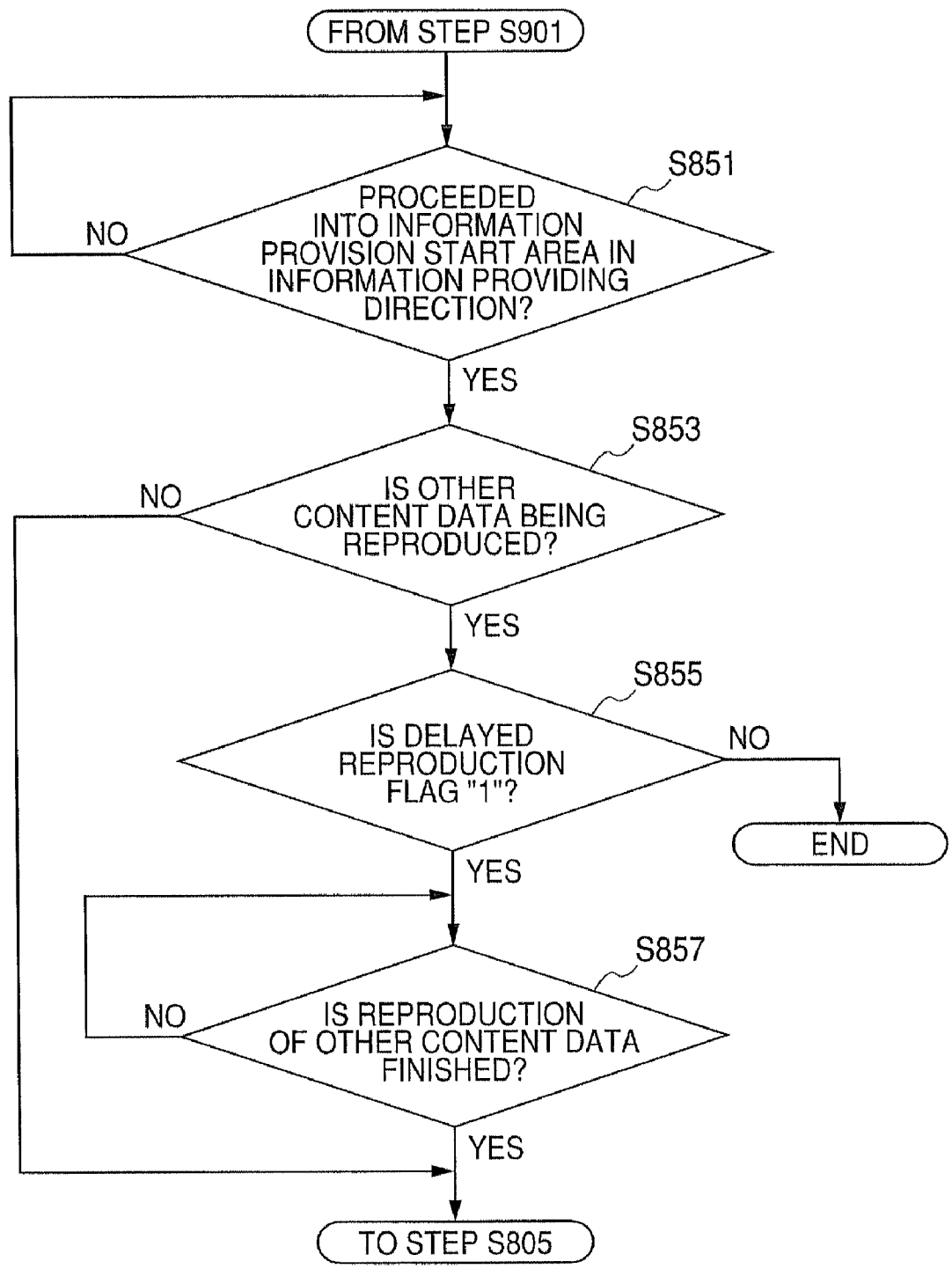
FIG. 16 is a flow chart for describing data reproduction processing in Embodiment 4.

Data reproduction processing performed by each unit of the present embodiment will now be described with reference to a flow chart in FIG. 16. Because the process of reading display control data in the above described embodiment (step S901) is the same in the present embodiment, the flow subsequent to the step S901 will be described.

The position match determining unit 255 determines whether the vehicle-mounted device 200 reached an information provision start area, and the direction match determining unit 257 determines whether the vehicle-mounted device 200 is proceeding in an information providing direction. That is, the position match determining unit 255 and the direction match determining unit 257 determine whether the vehicle-mounted device 200 proceeded into an information provision start area in an information providing direction (step S851). This process is continually performed. That is, the step S851 is iterated (No in the step S851) until the result of the determination becomes Yes (Yes in the step S851).

If the position match determining unit 255 and the direction match determining unit 257 determined that the vehicle-mounted device 200 proceeded into an information provision start area in an information providing direction (Yes in the step S851), the data reproducing unit 253 determines whether the vehicle-mounted device 200 is currently reproducing other content data (step S853). Other content data includes, for example, navigation guide that uses map information and should not be interrupted, another content data that can be reproduced in the information provision start area, content data whose reproduction is already started before entering the information provision start area but not finished yet, etc.

If it is determined that other content data is not being reproduced (No in the step S853), the data reproducing unit 253 performs processing of the step S805 and later. That is, reproduction of content data delivered from the roadside device 100 is started. This case is the same as the above described Embodiment 1.

On the other hand, if it is determined that other content data is being reproduced (Yes in the step S853), the data reproducing unit 253 determines whether a delayed reproduction flag is "1", that is, content data is specified so as to be reproduce after reproduction of other content data which is currently reproduced is finished (step S855).

If it is determined that a delayed reproduction flag is not "1" (but "0") (No in the step S855), the data reproducing unit 253 does not reproduce content data and exits. That is, in this case, content data set to be reproduced when the vehicle-mounted device 200 proceeded into the information provision start area in an information providing direction is not reproduced.

If it is determined that a delayed reproduction flag is "1" (Yes in the step S855), the data reproducing unit 253 determines whether reproduction of other content data being reproduced is finished (step S857). This process is iterated until reproduction of other content data is finished (No in the step S857).

If it is determined that reproduction of other content data is finished (Yes in the step S857), the processing of the data reproducing unit 253 goes to the step S805, and reproduction of content data is started. The processing after Yes in the step S857 is the same as that of the above described Embodiment 1 and thus will not be described.

Thus, according to the present embodiment, a timing of starting reproduction can be changed based on whether the vehicle-mounted device 200 is reproducing other content data. Also, it is possible to control so that content data is not reproduced. For example, when a driver is driving on a complicated road, approaching an intersection, starting or finishing making a turn, etc., it is expected that the vehicle-mounted device 200 is reproducing images and audio of navigation and the driver would have a trouble if that navigation is interrupted. Thus, if it is not appropriate to interruptingly reproduce content data like this, the vehicle-mounted device 200 may delay a timing of reproduction. It is up to a content providing side which content data's delayed reproduction flag is set to "1".

The present embodiment is for description only and does not limit the scope of the present invention. For example, it may be possible to store a computer program for having the vehicle-mounted device 200 work as a whole or part of an apparatus in a computer-readable recording medium such as a memory card, a CD-ROM, a DVD and an MO (Magneto Optical Disk), distribute the medium, install the program in other computer, and make the computer work as the vehicle-mounted device 200 or perform processes that the vehicle-mounted device 200 performs. Furthermore, the program may be stored in a disc apparatus or the like of a server apparatus on the internet so as to be downloaded to a computer by superimposing on a carrier wave, for example.

As described above, according to the present invention, an information providing system, an information providing method and a computer program suited for reproducing data as intended by a data delivering side can be provided.

The invention claimed is:

1. An information providing system, comprising:
   a position identifying unit adapted to identify a position of a vehicle-mounted device;
   a receiving unit adapted to receive content data and reproduction control data indicating a position at which the content data is to be reproduced, the content data and the reproduction control data being transmitted from a roadside device to the vehicle-mounted device via wireless communication;

a match detecting unit adapted to detect that the position of the vehicle-mounted device identified by the position identifying unit matches with the position at which the content data is to be reproduced which is indicated by the reproduction control data received at the receiving unit; and a data reproducing unit adapted to reproduce the content data if the match detecting unit detects a match.

2. An information providing system, comprising:

at least one roadside device placed on the roadside for transmitting information signal via wireless communication; and at least one vehicle-mounted device for receiving the information signal transmitted from the at least one roadside device via the wireless communication, and reproducing the received information signal for output;

wherein the at least one roadside device is placed at the roadside along the road through which a vehicle passes, in parking spaces, or in the proximity of the road and the parking spaces, each of the at least one roadside device comprising;

a storage unit adapted to store content data to be transmitted and reproduction control data indicating a condition required for reproducing the content data; and a wireless communication unit adapted to transmit the content data and the reproduction control data stored in the storage unit;

each of the at least one vehicle-mounted device comprising:

a position identifying unit adapted to identify a position of a vehicle-mounted device;

a receiving unit adapted to receive the content data and the reproduction control data transmitted from the roadside device;

a match detecting unit adapted to determine whether the position of the vehicle-mounted device identified by the position identifying unit matches with the condition required for reproducing the content data which the reproduction control data indicates; and a data reproducing unit adapted to reproduce the content data if the match detecting unit determines that there is a match.

3. An information providing system which wirelessly transmits information signal to a vehicle-mounted device mounted in a vehicle which passes in the proximity and allows the vehicle-mounted device to reproduce the information signal, comprising:

a storage unit, placed at the roadside along the road through which the vehicle passes, in parking spaces, or in the proximity of the road and the parking spaces, for storing content data to be transmitted and reproduction control data indicating a vehicle position at which the content data is to be reproduced by a vehicle-mounted device; and a wireless communication unit adapted to transmit the content data and the reproduction control data stored in the storage unit.

4. The information providing system according to any one of claims 1 to 3, wherein the reproduction control data includes:

control data which controls a vehicle-mounted device which received content data so that the vehicle-mounted device reproduces the content data received; and start control timing data which controls a timing of reproduction caused by the control data.

5. The information providing system according to claim 1 or 2, wherein the receiving unit comprises a storage unit for storing a plurality of pairs of content data received and corresponding reproduction control data, the position identifying unit comprises an extracting unit for extracting, when it is determined that one content data satisfies a reproduction condition, other content data which should be reproduced in parallel with the one content data from the content data stored in the storage unit, the data reproducing unit reproduces in parallel the one content data and the content data extracted by the extracting unit.

6. The information providing system according to claim 1 or 2, wherein the reproduction control data includes information indicating a plurality of reproduction positions, the match detecting unit determines that a position of a vehicle-mounted device matches with a reproduction position indicated by the reproduction control data if it matches with any one of the plurality of reproduction positions indicated by the reproduction control data.

7. The information providing system according to claim 1 or 2, wherein the content data includes advertising information of a store and business information representing business hours of the store as on/off of bit data by time period, the data reproducing unit comprises unit for timing a current time, the data reproducing unit determines whether the current time timed is in the business hours based on the business information, displaying the advertising information if the current time is in the business hours, and not displaying the advertising information if the current time is not in the business hours.

8. The information providing system according to claim 1 or 2, wherein the content data includes advertising information of a store, the data reproducing unit starts reproducing content when a vehicle moved to an information providing position or for a distance defined by an information provision start distance and the moving direction of the vehicle matches with the direction toward the store according to the reproduction control data.

9. The information providing system according to claim 1 or 2, wherein the content data includes information about a specific facility or position, reproduction start conditions defined by the reproduction control data includes a condition that a vehicle-mounted device is within a predetermined area based on the specific facility, the data reproducing unit reproduces the content data when the conditions are satisfied.

10. The information providing system according to claim 1 or 2, wherein the position identifying unit comprises traveling direction identifying unit for identifying the traveling direction of a vehicle-mounted device, the reproduction control data including information indicating a position and a direction as a reproduction condition, the data reproducing unit identifies and reproducing a content corresponding to condition information which substantially matches with a current position and the traveling direction.

11. The information providing system according to claim 1 or 2, wherein
the content data includes business information for business and traffic information,
the reproduction control data defines each of a reproduction condition of the business information and a reproduction condition of the traffic information,
the reproducing unit prioritizes reproducing the traffic information when the reproduction start condition of the business information matches with the reproduction condition of the traffic information.

12. The information providing system according to claim 11, wherein
the information providing system comprises reproduction condition modifying unit for detecting the reproduction condition of the traffic information and modifying the reproduction condition of the business information so that the reproduction condition of the business information does not match with the reproduction condition of the traffic information.

13. An information providing method, comprising the steps of:
identifying a position of a vehicle-mounted device;
receiving content data and reproduction control data indicating a position at which the content data is to be reproduced, the content data and the reproduction control data being transmitted from a roadside device to the vehicle-mounted device via wireless communication;
detecting that the position of the vehicle-mounted device identified by the position identifying unit matches with the position at which the content data is to be reproduced which is indicated by the reproduction control data received at the receiving unit; and
reproducing the content data if a match is detected.

14. An information providing method, comprising the steps of:
for reproducing the content data from a roadside device placed at the roadside along the road 1 wirelessly transmitting content data and reproduction control data indicating a condition required through which a vehicle passes, in parking spaces, or in the proximity of the road and the parking spaces;
identifying a position of a moving vehicle;
receiving the content data and the reproduction control data transmitted from the roadside device via wireless communication;
determining whether the identified position of the moving vehicle matches with the condition required for reproducing the content data which the reproduction control data indicates; and
reproducing the content data on the moving vehicle side if it is determined that there is a match.

15. An information providing method, comprising the steps of:
storing content data to be transmitted and reproduction control data indicating a condition required for reproducing the content data; and
wirelessly transmitting the content data and the reproduction control data from a vehicle-mounted device placed at the roadside along the road through which the vehicle passes, in parking spaces, or in the proximity of the road and the parking spaces.

16. A computer program for making a computer work as an information providing system according to claim 1 or 2 or actualizing each of the functions according to claim 13 or 15.

17. An information providing system, comprising at least one roadside device placed at the roadside for wirelessly transmitting information signal, and at least one vehicle-mounted device for receiving and reproducing the information signal wirelessly transmitted from the roadside device:
wherein the at least one roadside device is placed at the roadside along the road through which a vehicle passes, in parking spaces, or in the proximity of the road and the parking spaces, each of the at least one roadside device comprising:
a storage unit adapted to store content data to be transmitted and reproduction control data indicating a condition required for reproduction; and
a wireless communication unit adapted to transmit the content data and the reproduction control data stored in the storage unit;
each of the at least one vehicle-mounted device comprising:
a position acquiring unit adapted to acquire a position of a vehicle-mounted device;
a receiving unit adapted to receive the content data and the reproduction control data from the roadside device;
a determination unit adapted to determine whether the condition required for reproduction indicated by the reproduction control data received at the receiving unit is satisfied on the basis of the position of the vehicle-mounted device acquired by the position acquiring unit; and
a data reproducing unit for reproducing the content data if the determination unit determines that the condition required for reproduction is satisfied.

18. The information providing system according to claim 17, wherein
the content data includes information indicating a reproduction order of the content data and a combination of content data which is to be reproduced in parallel,
the data reproducing unit reproduces content data indicated by the combination among content data received by the receiving unit in the reproduction order.

19. The information providing system according to claim 18, wherein
the vehicle-mounted device further comprises:
a storage unit adapted to store a plurality of pairs of content data received by the receiving unit and reproduction control data corresponding to the content data; and
an extracting unit adapted to extract, if the determination unit determines that a reproduction condition of content data stored in the storage unit is satisfied, other content data which is to be reproduced in parallel with the content data from the storage unit on the basis of the reproduction control data,
the data reproducing unit reproduces in parallel the content data and the other content data extracted by the extracting unit.

20. The information providing system according to claim 18 or 19, wherein
the reproduction control data includes information indicating a plurality of reproduction positions,
the determination unit determines that the condition required for reproduction is satisfied if the position acquired by the position acquiring unit matches with any one of the plurality of reproduction positions.

21. The information providing system according to claim 17, wherein the reproduction control data further includes information indicating an information providing position indicating a position or area at which the content data is to be reproduced and a predetermined direction, the vehicle-mounted device further comprises direction acquiring unit for acquiring a moving direction thereof, the determination unit determines that the condition required for reproduction is satisfied if a current position acquired by the position acquiring unit is included in the information providing position and the moving direction acquired by the direction acquiring unit matches with the predetermined direction.

22. The information providing system according to claim 21, wherein the determination unit determines that a moving direction acquired by the direction acquiring unit matches with the predetermined direction if the moving direction is included in a direction within a predetermined angle range centered on the predetermined direction.

23. The information providing system according to claim 18 or 21, wherein the reproduction control data further includes information indicating a position of a specific facility and a predetermined distance, the determination unit determines that the condition required for reproduction is satisfied if a current position acquired by the position acquiring unit is included in a circle whose center is the position of the specific facility and whose radius is the predetermined distance.

24. The information providing system according to claim 18 or 21, wherein the reproduction control data includes advertising information of a store which provides the content data and business information representing business hours of the store as on/off of bit data by time period, the vehicle-mounted device further comprises a timing unit for timing a current time, the data reproducing unit determines whether the current time timed by the timing unit is included in the business hours, displaying the advertising information if it is determined that the current time is included in the business hours, and not displaying the advertising information if it is determined that the current time is not included in the business hours.

25. The information providing system according to claim 24, wherein the content data includes traffic information and business information for business of the store, the reproduction control data defining each of a reproduction condition of the business information and a reproduction condition of the traffic information, the data reproducing unit prioritizes reproducing the traffic information if the reproduction condition of the business information matches with the reproduction condition of the traffic information.

26. The information providing system according to claim 25, wherein the vehicle-mounted device further comprises reproduction condition modifying unit for modifying the reproduction condition of the business information so that the reproduction condition of the traffic information does not match with the reproduction condition of the business information.

27. The information providing system according to claim 18, wherein the vehicle-mounted device further comprises a map information storage unit adapted to store map information, the reproduction control data including information indicating a position at which reproduction of the content data starts and a kind of a road on which the content data is to be reproduced, the determination unit determines whether the condition required for reproduction is satisfied on the basis of the map information, the condition being that a current position indicated by the acquired position information matches with the position indicated by the reproduction control data and the current position is a road indicated by the kind of road on which the content data is to be reproduced.

28. The information providing system according to claim 18, wherein the vehicle-mounted device further comprises a time acquiring unit adapted to acquire a current time, the reproduction control data including information indicating a position at which reproduction of the content data starts and a time period in which the content data is to be reproduced, the determination unit determines whether the condition required for reproduction is satisfied, the condition being that a current position acquired by the position acquiring unit matches with the position indicated by the reproduction control data and the current time acquired by the time acquiring unit is included in the time period in which the content data is to be reproduced.

29. The information providing system according to claim 18, wherein the vehicle-mounted device further comprises a map information storage unit for storing map information, the reproduction control data including information indicating a position of a specific facility and a predetermined distance, the determination unit determines whether the condition required for reproduction is satisfied on the basis of the map information, the condition being that a current position acquired by the position acquiring unit is included in a circle whose center is the position of the specific facility indicated by the reproduction control data and whose radius is the predetermined distance.

30. The information providing system according to claim 18, wherein the vehicle-mounted device further comprises a map information storage unit for storing map information, the reproduction control data including information associating a position at which reproduction of the content data starts with a predetermined distance, the determination unit determines whether the condition required for reproduction is satisfied on the basis of the map information, the condition being that a current position acquired by the position acquiring unit is included in a circle whose center is the position indicated by the reproduction control data and whose radius is the predetermined distance.

31. The information providing system according to claim 30, wherein the vehicle-mounted device further comprises a map information storage unit adapted to store map information and traveling direction identifying unit adapted to identify a traveling direction thereof, the reproduction control data further including information indicating a predetermined direction, the determination unit determines whether the condition required for reproduction is satisfied on the basis of the map information, the condition being that a current position acquired by the position acquiring unit is included in a circle whose center is the position indicated by the reproduction control data and whose radius is the predetermined distance and the traveling direction identified by the traveling direction identifying unit matches with the predetermined direction indicated by the reproduction control data.

32. The information providing system according to claim 18, wherein
the reproduction control data further includes reproduction information indicating whether reproduction of other content data is to be stopped to reproduce the content data when the other content data is being reproduced,
the data reproducing unit, if the condition required for reproduction is satisfied,
(a) reproducing the content data when the other content data is not being reproduced,
(b1) reproducing the content data after finishing reproducing the other content data when the other content data is being reproduced and the reproduction information indicates that reproduction of the other content data is to be stopped to reproduce the content data, and
(b2) not reproducing the content data if the other content data is being reproduced and the reproduction information indicates that reproduction of the other content data is not to be stopped to reproduce the content data.

33. An information providing apparatus, comprising:
a position acquiring unit adapted to acquire a position of a vehicle-mounted device;
a receiving unit adapted to receive content data and reproduction control data indicating a condition required for reproduction, the content data and the reproduction control data being received from a roadside device placed at the roadside for wirelessly transmitting the content data and the reproduction control data;
a determination unit adapted to determine whether the condition required for reproduction indicated by the reproduction control data received at the receiving unit is satisfied on the basis of the position of the vehicle-mounted device acquired by the position acquiring unit; and
a data reproducing unit adapted to reproduce the content data if the determination unit determines that the condition required for reproduction is satisfied.

34. The information providing apparatus according to claim 33, wherein
the reproduction control data further includes information indicating an information providing position indicating a position or area at which the content data is to be reproduced and a predetermined direction,
the information providing apparatus further comprises a direction acquiring unit adapted to acquire a moving direction of a vehicle-mounted device,
the determination unit determines that the condition required for reproduction is satisfied if a current position acquired by the position acquiring unit is included in the information providing position and the moving direction acquired by the direction acquiring unit matches with the predetermined direction.

35. The information providing apparatus according to claim 33, wherein
the content data includes information indicating a reproduction order of the content data and a combination of content data which is to be reproduced in parallel,
the data reproducing unit reproduces content data indicated by the combination among content data received by the receiving unit in the reproduction order.

36. An information providing method, comprising the steps of:
acquiring a position of a vehicle-mounted device;
receiving content data and reproduction control data indicating a condition required for reproduction, the content data and the reproduction control data being received from a roadside device placed at the roadside for wirelessly transmitting the content data and the reproduction control data;
determining whether the condition required for reproduction indicated by the reproduction control data received at the receiving step is satisfied on the basis of the position of the vehicle-mounted device acquired by the acquiring step; and
reproducing the content data if it is determined in the determining step that the condition required for reproduction is satisfied.

37. A computer readable program stored in the memory, the program being executed on a computer so as to allow the computer to operate as:
a position acquiring unit adapted to acquire a position of a vehicle-mounted device;
a receiving unit adapted to receive content data and reproduction control data indicating a condition required for reproduction, the content data and the reproduction control data being received from a roadside device placed at the roadside for wirelessly transmitting the content data and the reproduction control data;
a determination unit adapted to determine whether the condition required for reproduction indicated by the reproduction control data received at the receiving unit is satisfied on the basis of the position of the vehicle-mounted device acquired by the position acquiring unit; and
a data reproducing unit adapted to reproduce the content data if the determination unit determines that the condition required for reproducing the content data is satisfied.

* * * * *